(12) United States Patent
Henniger et al.

(10) Patent No.: US 11,541,269 B2
(45) Date of Patent: Jan. 3, 2023

(54) WEIGHT RACK AND MOUNTING RAIL, ACCESSORY, AND ASSEMBLY FOR WEIGHT RACK

(71) Applicant: Coulter Ventures, LLC., Columbus, OH (US)

(72) Inventors: Bill Henniger, Columbus, OH (US); Bryan Adams, Columbus, OH (US)

(73) Assignee: Coulter Ventures, LLC., Columbus, OH (US)

( * ) Notice: Subject to any disclaimer, the term of this patent is extended or adjusted under 35 U.S.C. 154(b) by 51 days.

(21) Appl. No.: 16/899,113

(22) Filed: Jun. 11, 2020

(65) Prior Publication Data

US 2020/0391070 A1 Dec. 17, 2020

Related U.S. Application Data

(60) Provisional application No. 62/860,129, filed on Jun. 11, 2019.

(51) Int. Cl.
*A63B 21/078* (2006.01)
*A47B 96/14* (2006.01)
(Continued)

(52) U.S. Cl.
CPC ............ *A63B 21/078* (2013.01); *A47B 47/00* (2013.01); *A47B 81/00* (2013.01); *A47B 96/14* (2013.01)

(58) Field of Classification Search
CPC .............. A63B 21/078; A63B 21/0724; A63B 71/0036; A47B 47/00; A47B 81/00;
(Continued)

(56) References Cited

U.S. PATENT DOCUMENTS 3,794,183 A * 2/1974 Colbridge .............. A47B 46/00
211/208
5,468,203 A * 11/1995 Okonkwo ............ A63B 21/078
482/4

(Continued)

OTHER PUBLICATIONS

Graham; "The Virtues of a Picatinny Rail"; Article; https://www.americanhunter.org/articles/2016/11/10/the-virtues-of-a-picatinny-rail/; Nov. 10, 2016; 3 pages; American Hunter.
(Continued)

*Primary Examiner* — Stanton L Krycinski
(74) *Attorney, Agent, or Firm* — Banner & Witcoff, Ltd.

(57) ABSTRACT

An assembly for use with a weight rack includes a mounting rail for mounting to the weight rack, including a plurality of rail sections extending laterally and spaced along the length of the mounting rail to define slots therebetween. The accessory includes a mounting portion for removably mounting to the mounting rail and a functional portion connected to the mounting portion for use in a weightlifting exercise. The mounting portion includes a fixed portion and a moveable portion that is moveable with respect to the fixed portion between a locked position, where the fixed portion and the moveable portion engage the mounting rail, and a release position, where the accessory can be removed from the rail. The mounting portion also includes a peg received in one of the slots of the mounting rail and a locking mechanism that moves the moveable portion between the locked position and the release position.

22 Claims, 34 Drawing Sheets

(51) Int. Cl.
*A47B 47/00* (2006.01)
*A47B 81/00* (2006.01)

(58) Field of Classification Search
CPC ....... A47B 96/14; A47B 96/061; A47B 57/34; A47B 57/52; F16B 12/36
See application file for complete search history.

(56) References Cited

U.S. PATENT DOCUMENTS

| | | | | |
|---|---|---|---|---|
| 7,063,649 | B2 * | 6/2006 | Szultka | A63B 21/072 |
| | | | | 482/99 |
| 8,276,307 | B2 * | 10/2012 | Deros | F41G 11/003 |
| | | | | 42/127 |
| 8,337,370 | B2 * | 12/2012 | Rogers | A63B 71/0036 |
| | | | | 482/94 |
| 8,353,125 | B2 * | 1/2013 | Riley | F41G 11/003 |
| | | | | 248/315 |
| 9,044,643 | B2 * | 6/2015 | Staten | A63B 21/0783 |
| 9,297,616 | B2 * | 3/2016 | Daniel | F41G 11/004 |
| 9,597,539 | B2 * | 3/2017 | Grider | A63B 21/00047 |
| 9,671,198 | B2 * | 6/2017 | Bartoszewicz | F41G 11/003 |
| 9,784,536 | B2 * | 10/2017 | Boswell | F41G 11/004 |
| 9,907,991 | B2 * | 3/2018 | Leipheimer | A63B 21/0626 |
| 10,024,632 | B1 * | 7/2018 | Oglesby | F41G 11/003 |
| 10,030,940 | B2 * | 7/2018 | Sheets, Jr. | F41C 27/00 |
| 10,036,614 | B1 * | 7/2018 | Ruiz | F41G 11/003 |
| 10,058,728 | B2 * | 8/2018 | Kelly | A63B 21/078 |
| 10,132,596 | B2 * | 11/2018 | Bartoszewicz | F41G 11/003 |
| 10,184,747 | B1 * | 1/2019 | Courter | F41A 23/50 |
| 10,317,174 | B2 * | 6/2019 | Samson | F41G 11/004 |
| 10,371,317 | B2 * | 8/2019 | Chen | F16M 11/043 |
| 10,426,993 | B2 * | 10/2019 | Ostmeyer | A63B 21/0783 |
| 10,443,985 | B2 * | 10/2019 | Cosentino | F41G 11/003 |
| 10,612,718 | B2 * | 4/2020 | Johnson, Sr. | F16M 11/041 |
| 10,655,929 | B2 * | 5/2020 | Stewart | F41C 27/00 |
| 10,684,092 | B2 * | 6/2020 | Kennair, Jr. | F41C 27/00 |
| 10,792,535 | B2 * | 10/2020 | Chou | A63B 1/00 |
| 10,837,739 | B2 * | 11/2020 | Ramirez | F41G 11/003 |
| 11,085,736 | B2 * | 8/2021 | Johnson, Sr. | F41G 11/003 |
| 11,110,316 | B2 * | 9/2021 | Sergakis | A63B 21/078 |
| 11,173,337 | B2 * | 11/2021 | Jones | A63B 21/0628 |
| 11,255,531 | B2 * | 2/2022 | Schorr, III | F21V 23/0435 |
| 2011/0247255 | A1 * | 10/2011 | Ding | F41G 11/003 |
| | | | | 42/90 |
| 2012/0266514 | A1 * | 10/2012 | Michal | F41C 23/18 |
| | | | | 42/90 |
| 2012/0285067 | A1 * | 11/2012 | Kitzen | F41G 11/003 |
| | | | | 42/90 |
| 2013/0133238 | A1 * | 5/2013 | Quetschke | F41A 35/00 |
| | | | | 29/428 |
| 2014/0252187 | A1 * | 9/2014 | Petrovic | F16B 2/185 |
| | | | | 248/229.16 |
| 2015/0016919 | A1 * | 1/2015 | Tambornino | F16B 35/06 |
| | | | | 411/366.1 |
| 2016/0146573 | A1 * | 5/2016 | Kunkel | F41C 27/22 |
| | | | | 42/90 |
| 2017/0007877 | A1 * | 1/2017 | Leipheimer | A63B 21/4029 |
| 2018/0353795 | A1 * | 12/2018 | Ostmeyer | A63B 1/00 |
| 2019/0331459 | A1 * | 10/2019 | Johnson, Sr. | F41G 11/003 |
| 2020/0109913 | A1 * | 4/2020 | Hanson | G09F 3/08 |
| 2020/0261759 | A1 * | 8/2020 | Downing | A63B 71/0036 |
| 2022/0042773 | A1 * | 2/2022 | Kincel | F41C 27/00 |

OTHER PUBLICATIONS

Guthrie; "Rail Crazy: Picatinny Rail Basics"; Article; https://www.shootingtimes.com/editorial/optics_st_railcrazy_200907/99242; Sep. 23, 2010; 9 pages.

Army-AR; "Military Standard Dimensioning of Accessory Mounting Rail for Small Arms Weapons"; https://web.archive.org/web/20101126233329/http://quarterbore.com/library/pdf_files/mil-std-1913.pdf; Standardization Document Improvement Proposal; Feb. 3, 1995; 11 pages.

* cited by examiner

WEIGHT RACK AND MOUNTING RAIL, ACCESSORY, AND ASSEMBLY FOR WEIGHT RACK

CROSS-REFERENCE TO RELATED APPLICATION

This application is a non-provisional of, and claims priority to, U.S. Provisional Application No. 62/860,129, filed Jun. 11, 2019, which prior application is incorporated herein by reference in its entirety.

FIELD OF THE INVENTION

This disclosure relates to weightlifting equipment, and more specifically to weight racks having mounting rails with structure to permit quick connection and disconnection of accessories, as well as such mounting rails and accessories and assemblies including the same.

BRIEF SUMMARY

General aspects of the present disclosure relate to an accessory for mounting on a weight rack, a mounting rail for mounting the accessory to the weight rack, and a weight rack having one or more such mounting rails and/or accessories mounted thereon. The mounting rail includes a plurality of rail sections extending laterally and spaced along the length of the mounting rail to define a plurality of slots therebetween. The accessory includes a mounting portion for removably mounting to the mounting rail and a functional portion connected to the mounting portion and configured for use in a weightlifting exercise. The mounting portion includes a fixed portion and a moveable portion that is moveable with respect to the fixed portion between a locked position, where the fixed portion and the moveable portion engage the mounting rail, and a release position, where the accessory can be removed from the mounting rail. The mounting portion also includes a peg received in one of the slots of the mounting rail and a locking mechanism that moves the moveable portion between the locked position and the release position.

Aspects of the disclosure relate to an assembly for mounting on a weight rack, including a mounting rail having a mounting structure configured for removably mounting the mounting rail on a frame member of a weight rack, and an accessory mounted on the mounting rail, the accessory including a mounting portion removably connected to the mounting rail and a functional portion connected to the mounting portion and configured for use in a weightlifting exercise. The mounting rail includes a base that is elongated along a longitudinal direction and a plurality of rail sections extending outward from the base and extending in a lateral direction that is perpendicular to the longitudinal direction. Each of the plurality of rail sections is identical and has flanges extending laterally outward of the base on opposed lateral edges of the base. The plurality of rail sections are spaced along the longitudinal direction to define a plurality of identical slots between the rail sections. The mounting portion includes a fixed portion having an outer wall and a first side wall extending transversely from the outer wall, and a first lip extending laterally inward from the first side wall, and a moveable portion having a second side wall extending transversely to the outer wall of the fixed portion and spaced from the first side wall, and a second lip extending laterally inward from the second side wall, such that the outer wall, the first and second side walls, and the first and second lips combine to define a channel receiving a portion of the mounting rail therein. The moveable portion is moveable with respect to the fixed portion between a release position, where the mounting rail can be disengaged from the mounting portion, and a locked position, where the fixed portion and the moveable portion engage the mounting rail to retain the accessory in connection with the mounting rail such that the first and second lips extend beneath the flanges of a first rail section and a second rail section of the plurality of rail sections of the mounting rail. The mounting portion also includes a peg engaged with the fixed portion and the moveable portion and extending across the channel, where the peg is received in one of the plurality of slots located between the first and second rail sections and configured to engage side surfaces of the first and second rail sections. The mounting portion further includes a locking mechanism connected to the peg and configured to be moveable between a first position, where the locking mechanism engages the moveable portion to retain the moveable portion in the locked position, and a second position, where the locking mechanism permits the moveable portion to move to the release position. Movement of the locking mechanism from the second position to the first position is configured to force the moveable portion to the locked position.

According to one aspect, when the moveable portion is in the release position, a space defined between the first and second lips is sufficient to permit the flanges of the first and second rail sections to pass between the first and second lips.

According to another aspect, the peg has a first pin at a first end that extends through a first opening in the fixed portion to engage the peg with the fixed portion and a second pin at a second end opposite the first end that extends through a second opening in the moveable portion to engage the peg with the moveable portion. In one embodiment, the first pin is engaged with the fixed portion by a fastener and the second pin is a pivot pin that forms a pivot connection with the locking mechanism. In another embodiment, the locking mechanism includes a lever that is moveable by pivoting between the first and second positions, and the second pin is a pivot pin that forms a pivot connection with the lever. Further, the first pin may be a threaded pin that is connected to the fixed portion by a threaded fastener, and the lever may have a cam surface configured to engage the moveable portion to force the moveable portion to the locked position when the lever is moved from the second position to the first position.

According to a further aspect, the locking mechanism includes a lever connected to the peg by a pivot pin to form a pivot connection, and the lever has a cam surface configured to engage the moveable portion to force the moveable portion to the locked position when the lever is moved from the second position to the first position.

According to yet another aspect, the fixed portion has a recess with a first retaining lip extending over the recess, and the moveable portion is received within the recess and has a second retaining lip that engages the first retaining lip to retain the fixed portion and the moveable portion together.

According to a still further aspect, the mounting structure of the mounting rail includes a plurality of mounting pegs extending from an inner surface of the mounting rail opposite the rail sections, each mounting peg having an enlarged head, where the mounting pegs are configured to be inserted within holes in the frame member to removably connect the mounting rail to the weight rack. In one embodiment, the mounting rail has a plurality of projections on the inner surface of the mounting rail, each of the projections having an aperture extending through the projection and through a thickness of the mounting rail, where the mounting pegs are connected to the mounting rail by fasteners received through the apertures, such that the mounting pegs engage the projections.

Additional aspects of the disclosure relate to an accessory configured for mounting on a mounting rail as discussed above, the accessory including a mounting portion configured to be removably mounted on the mounting rail and a functional portion connected to the mounting portion and configured for use in a weightlifting exercise. The mounting portion includes a fixed portion having an outer wall and a first side wall extending transversely from the outer wall, and a first lip extending laterally inward from the first side wall and a moveable portion having a second side wall extending transversely to the outer wall of the fixed portion and spaced from the first side wall, and a second lip extending laterally inward from the second side wall, such that the outer wall, the first and second side walls, and the first and second lips combine to define a channel configured for receiving a portion of the mounting rail therein. The moveable portion is moveable with respect to the fixed portion between a release position, where the mounting rail is configured to be disengaged from the mounting portion, and a locked position, where the fixed portion and the moveable portion are configured to engage the mounting rail to retain the accessory in connection with the mounting rail such that the first and second lips are configured to extend beneath the flanges of a first rail section and a second rail section of the plurality of rail sections of the mounting rail. The mounting portion also includes a peg engaged with the fixed portion and the moveable portion and extending across the channel, where the peg is configured to be received in one of the plurality of slots located between the first and second rail sections and configured to engage side surfaces of the first and second rail sections. The mounting portion further includes a locking mechanism connected to the peg and configured to be moveable between a first position, where the locking mechanism engages the moveable portion to retain the moveable portion in the locked position, and a second position, where the locking mechanism permits the moveable portion to move to the release position. Movement of the locking mechanism from the second position to the first position is configured to force the moveable portion to the locked position.

According to one aspect, the peg has a first pin at a first end that extends through a first opening in the fixed portion to engage the peg with the fixed portion and a second pin at a second end opposite the first end that extends through a second opening in the moveable portion to engage the peg with the moveable portion. In one embodiment, the first pin is engaged with the fixed portion by a fastener and the second pin is a pivot pin that forms a pivot connection with the locking mechanism. In another embodiment, the locking mechanism includes a lever that is moveable by pivoting between the first and second positions, and the second pin is a pivot pin that forms a pivot connection with the lever. Further, the first pin may be a threaded pin that is connected to the fixed portion by a threaded fastener, and the lever may have a cam surface configured to engage the moveable portion to force the moveable portion to the locked position when the lever is moved from the second position to the first position.

According to another aspect, the accessory further includes a second mounting portion connected to the functional portion and configured to be removably mounted on a second mounting rail spaced from the mounting rail, such that the functional portion is extends between the mounting portion and the second mounting portion and is configured to be supported by the mounting portion and the second mounting portion.

According to a further aspect, the locking mechanism includes a lever connected to the peg by a pivot pin to form a pivot connection, the lever having a cam surface configured to engage the moveable portion to force the moveable portion to the locked position when the lever is moved from the second position to the first position. Additionally, the fixed portion has a recess with a first retaining lip extending over the recess, and the moveable portion is received within the recess and has a second retaining lip that engages the first retaining lip to retain the fixed portion and the moveable portion together.

Further aspects of the disclosure relate to a weightlifting rack that includes a plurality of frame members including a plurality of horizontal frame members and a plurality of vertical frame members connected together to form a frame for use in performing a weightlifting exercise, the plurality of frame members including a first frame member extending along a longitudinal direction and having a plurality of holes extending therethrough, a mounting rail removably mounted on the first frame member, and an accessory mounted on the mounting rail. The mounting rail has a mounting structure received in at least one of the plurality of holes to removably mount the mounting rail on a frame member of a weight rack. The mounting rail further includes a base that is elongated along the longitudinal direction and a plurality of rail sections extending outward from the base and extending in a lateral direction that is perpendicular to the longitudinal direction. Each of the plurality of rail sections is identical and has flanges extending laterally outward of the base on opposed lateral edges of the base. The plurality of rail sections are spaced along the longitudinal direction to define a plurality of identical slots between the rail sections. The accessory includes a mounting portion removably connected to the mounting rail and a functional portion connected to the mounting portion and configured for use in a weightlifting exercise. The mounting portion includes a fixed portion having an outer wall and a first side wall extending transversely from the outer wall, and a first lip extending laterally inward from the first side wall, and a moveable portion having a second side wall extending transversely to the outer wall of the fixed portion and spaced from the first side wall, and a second lip extending laterally inward from the second side wall, such that the outer wall, the first and second side walls, and the first and second lips combine to define a channel receiving a portion of the mounting rail therein. The moveable portion is moveable with respect to the fixed portion between a release position, where the mounting rail can be disengaged from the mounting portion, and a locked position, where the fixed portion and the moveable portion engage the mounting rail to retain the accessory in connection with the mounting rail such that the first and second lips extend beneath the flanges of a first rail section and a second rail section of the plurality of rail sections of the mounting rail. The mounting portion also includes a peg engaged with the fixed portion and the moveable portion and extending across the channel, where the peg is received in one of the plurality of slots located between the first and second rail sections and configured to engage side surfaces of the first and second rail sections. The mounting portion further includes a locking mechanism connected to the peg and configured to be moveable between a first position, where the locking mechanism engages the moveable portion to retain the moveable portion in the locked position, and a second position, where the locking mechanism permits the moveable portion to move to the release position. Movement of the locking mechanism from the second position to the first position is configured to force the moveable portion to the locked position.

According to one aspect, the plurality of holes of the first frame member include first and second key-shaped holes, each having a circular periphery with a cut-out having a narrower width than the circular periphery extending outward from the circular periphery. The mounting structure of the mounting rail includes first and second mounting pegs extending from an inner surface of the mounting rail opposite the rail sections, each of the first and second mounting pegs having an elongated body and an enlarged head having a width that is smaller than the circular peripheries and larger than the narrower widths of the cut-outs of the first and second key-shaped holes. The mounting rail is configured to be mounted on a first surface of the first frame member by inserting the first and second mounting pegs through the first and second key-shaped holes such that the elongated bodies of the first and second mounting pegs are received in the cut-outs of the first and second key-shaped holes and the enlarged heads engage a second surface of the first frame member opposite the first surface. In one embodiment, the mounting rail has first and second projections on the inner surface of the mounting rail, each of the first and second projections having an aperture extending therethrough and through a thickness of the mounting rail. The first and second mounting pegs are connected to the mounting rail by fasteners received through the apertures, such that the first and second mounting pegs engage the first and second projections.

According to another aspect, the locking mechanism includes a lever that is moveable by pivoting between the first and second positions, the lever having a cam surface configured to engage the moveable portion to force the moveable portion to the locked position when the lever is moved from the second position to the first position. Additionally, the peg has a first pin at a first end that extends through a first opening in the fixed portion to and is engaged with the fixed portion by a fastener and a second pin at a second end opposite the first end that extends through a second opening in the moveable portion and engages the lever to form a pivot connection with the lever. In one embodiment, the plurality of holes of the first frame member include first and second holes, and the mounting structure of the mounting rail comprises first and second removable connection members. The mounting rail is configured to be mounted on a first surface of the first frame member by inserting the first and second connection members through the first and second holes, such that the first and second connection members engage a second surface of the first frame member opposite the first surface.

Other features and advantages of the disclosure will be apparent from the following description taken in conjunction with the attached drawings.

BRIEF DESCRIPTION OF THE DRAWINGS

To allow for a more full understanding of the present disclosure, it will now be described by way of example, with reference to the accompanying drawings in which.

DETAILED DESCRIPTION

Figure 1:
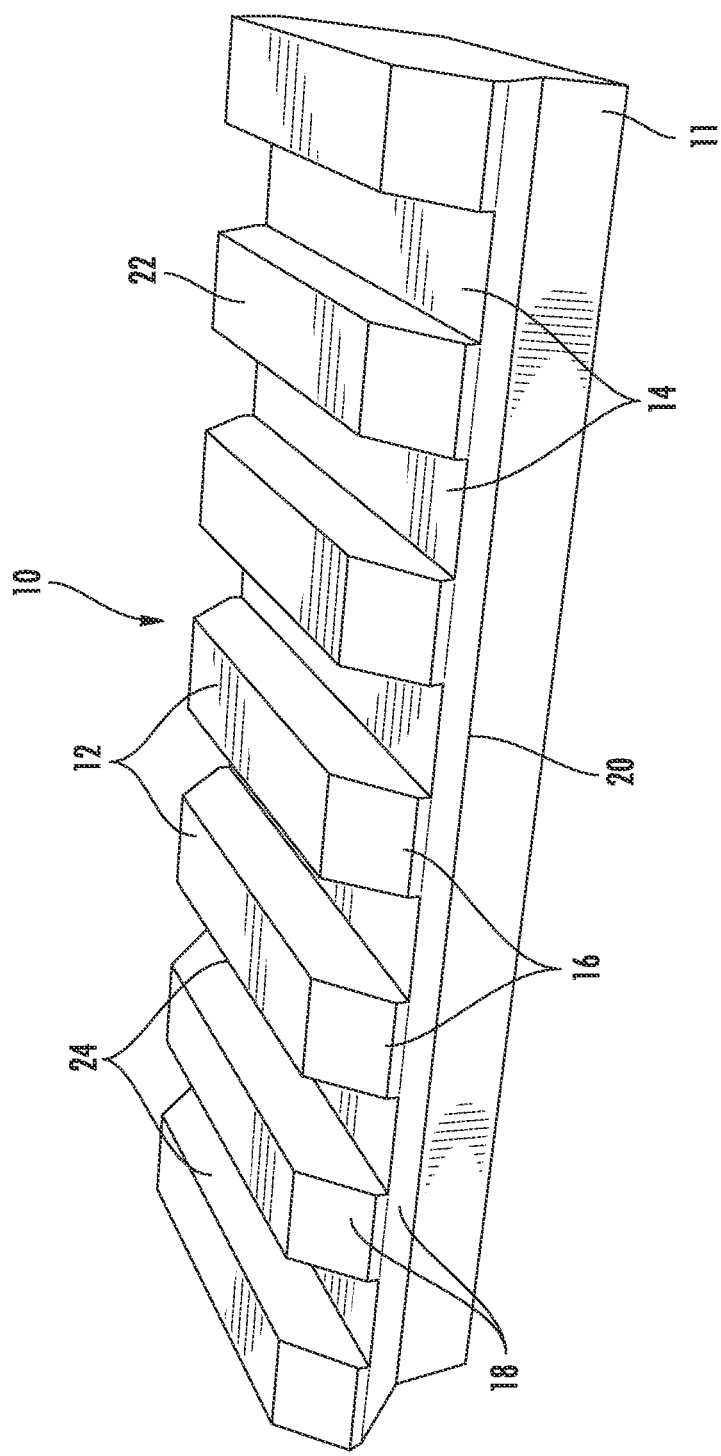
FIG. 1 is a perspective view of one embodiment of a mounting rail according to aspects of the disclosure.
Figure 2:
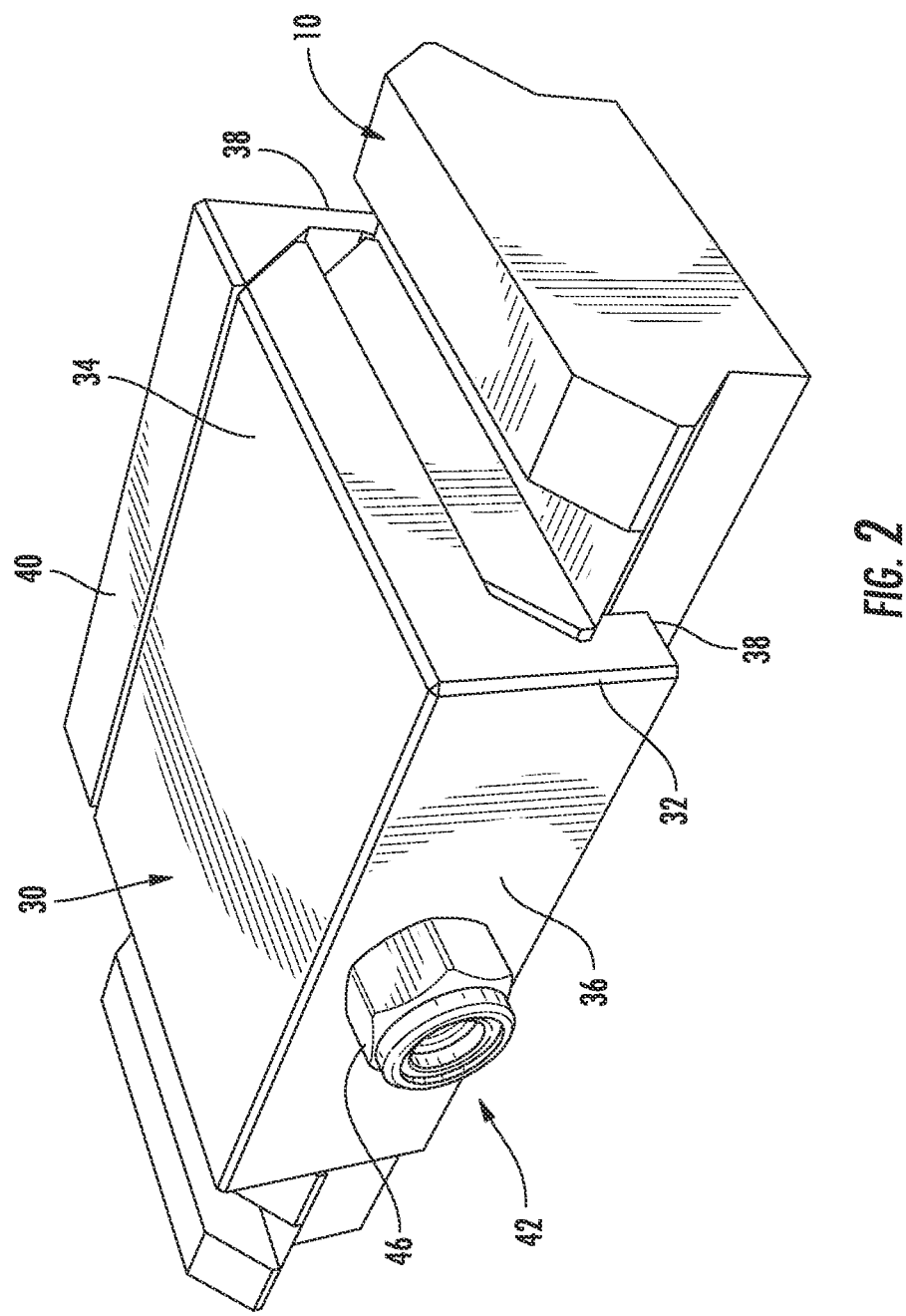
FIG. 2 is a perspective view of one embodiment of an accessory mounted on the mounting rail of FIG. 1, according to aspects of the disclosure.
Figure 3:
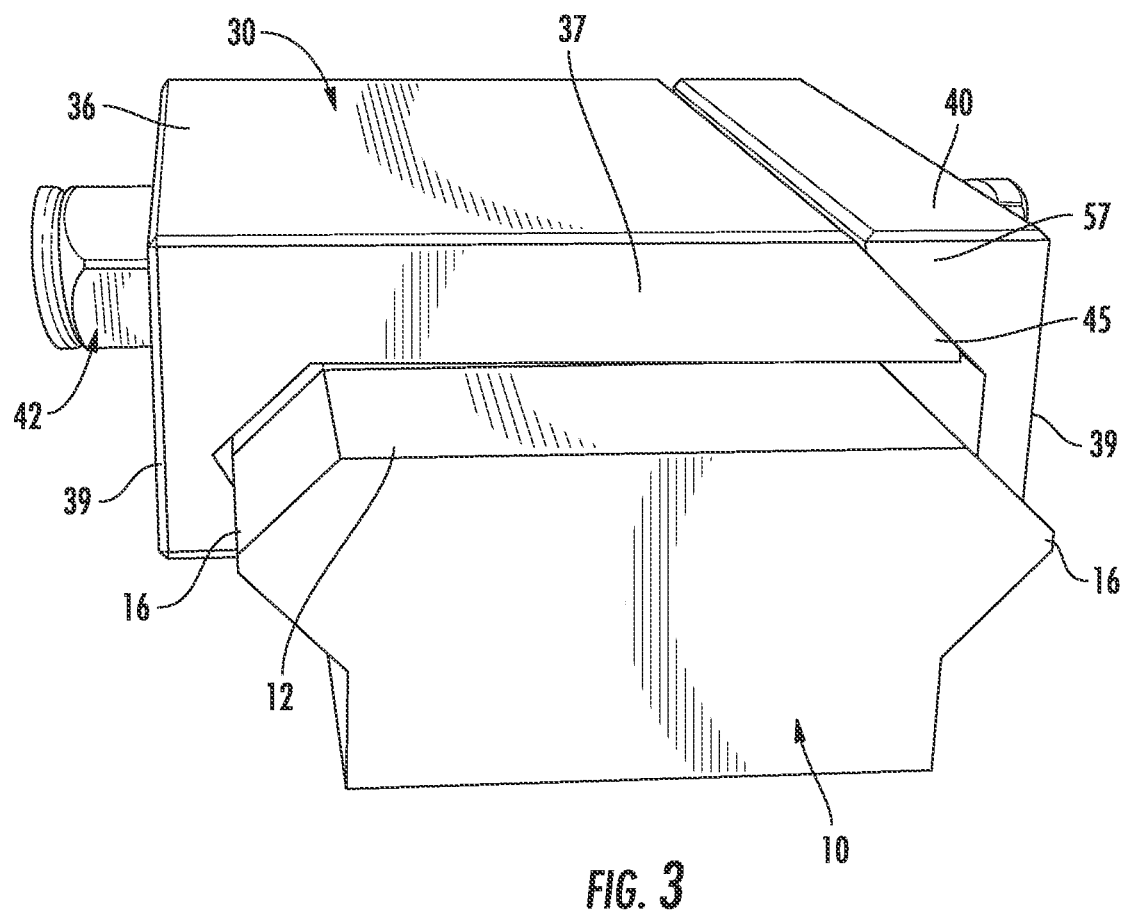
FIG. 3 is an end view of the accessory and the mounting rail of FIG. 2.
Figure 4:
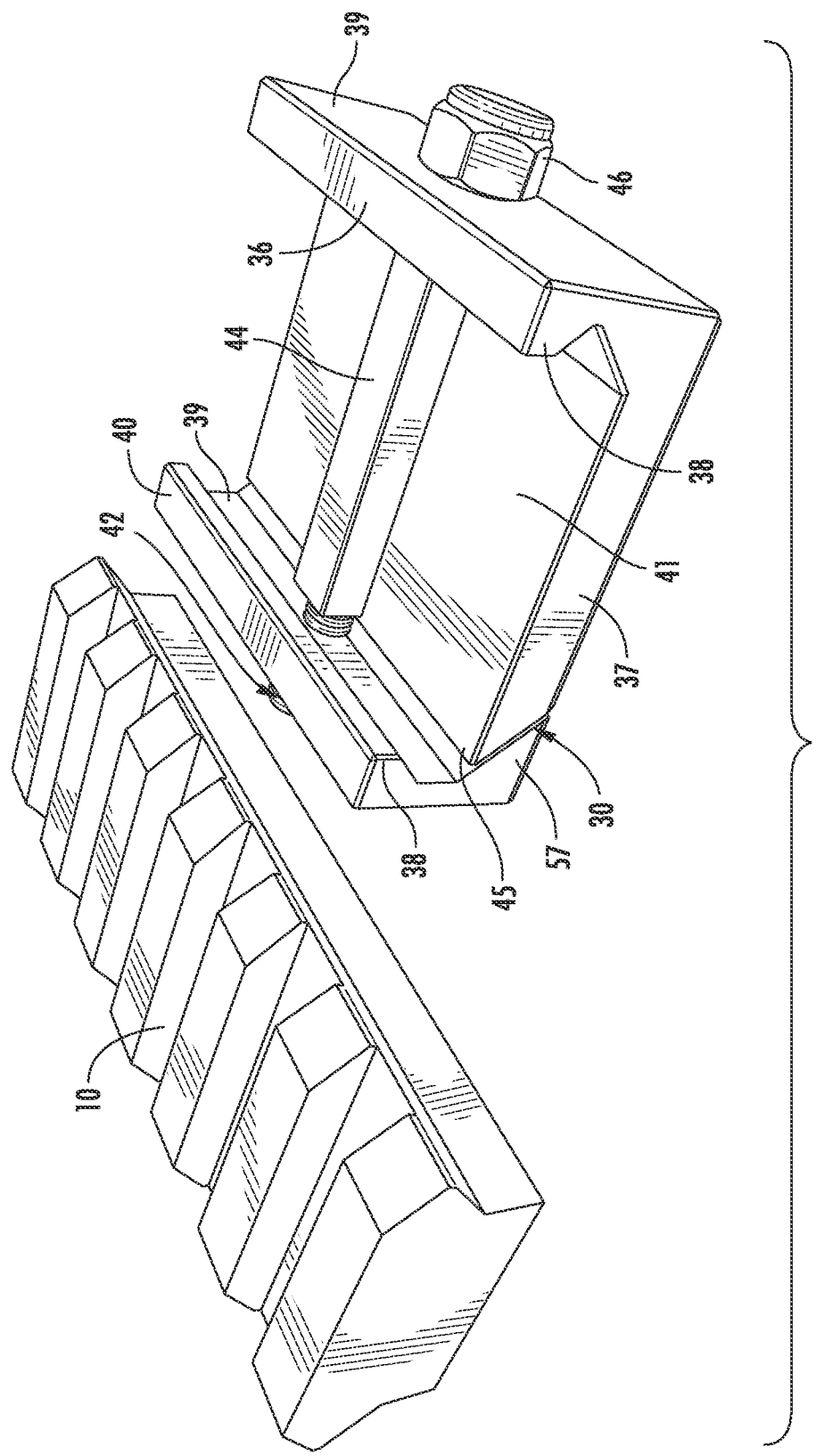
FIG. 4 is a perspective view of the accessory and the mounting rail of FIG. 2, with the accessory disconnected from the mounting rail.

While this invention is susceptible of embodiments in many different forms, there are shown in the drawings and will herein be described in detail example embodiments of the invention with the understanding that the present disclosure is to be considered as an exemplification of the principles of the invention and is not intended to limit the broad aspect of the invention to the embodiments illustrated. In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention.

Figure 8:
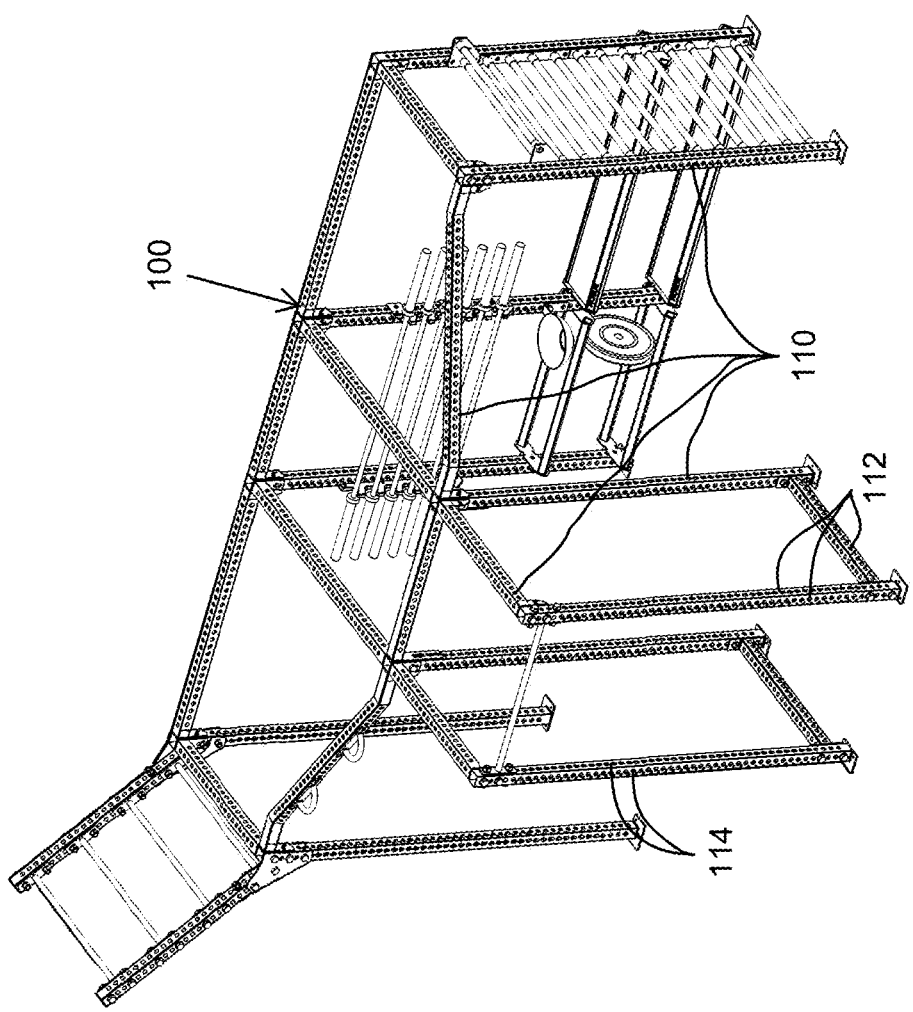
FIG. 8 is a perspective view of an example of a weight rack that may be used in connection with aspects of the disclosure.
Figure 9:
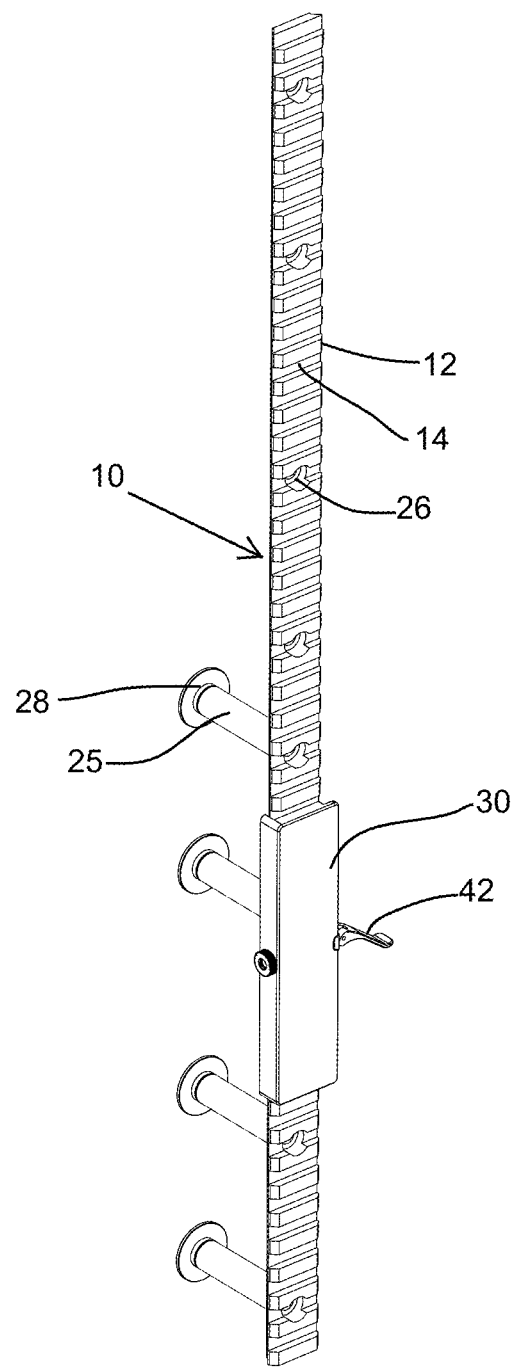
FIG. 9 is a perspective view of another embodiment of an accessory mounted on a mounting rail, including two different mounting rail configurations, according to aspects of the disclosure.
Figure 10:
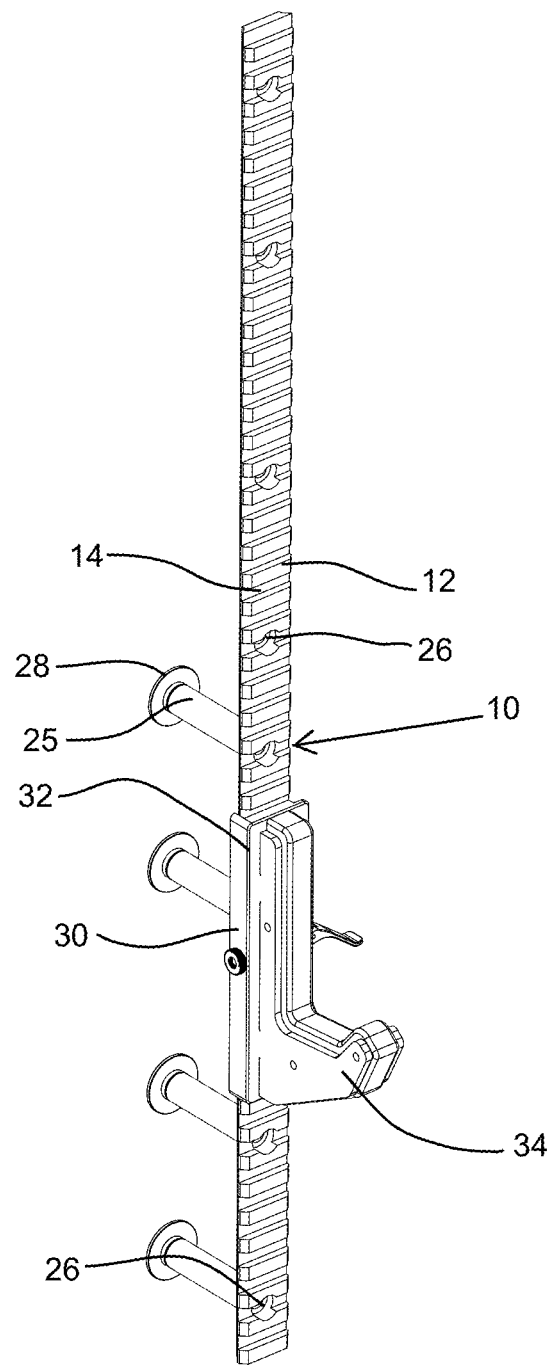
FIG. 10 is a perspective view of the accessory and the mounting rail of FIG. 9, with the accessory including a functional portion.
Figure 11:
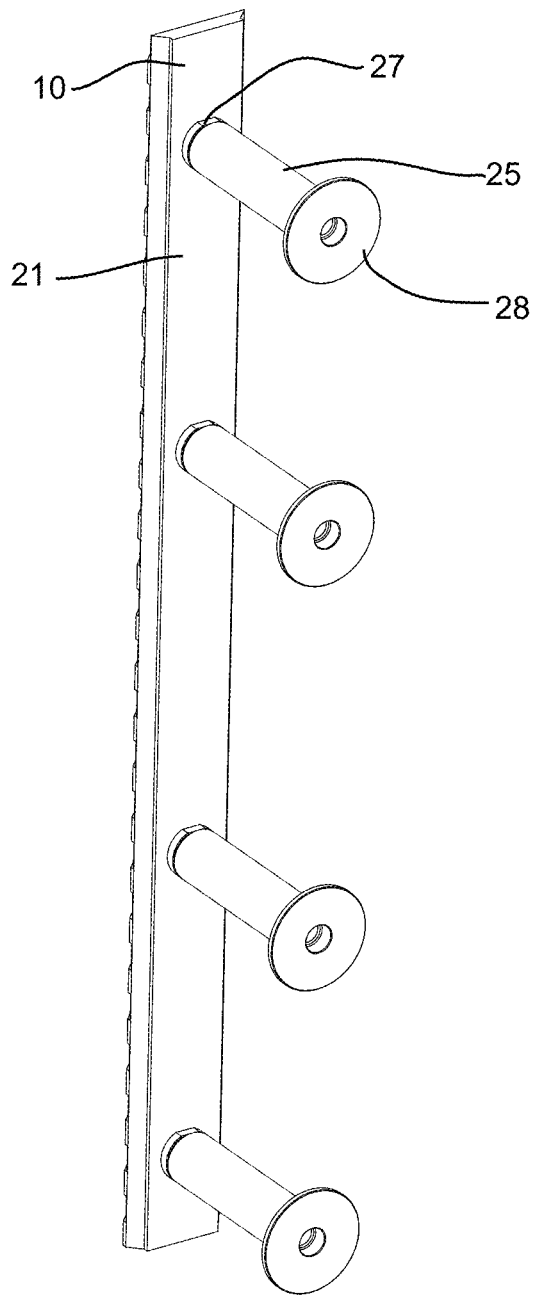
FIG. 11 is a rear perspective view of a first configuration of the mounting rail of FIG. 9.
Figure 12:
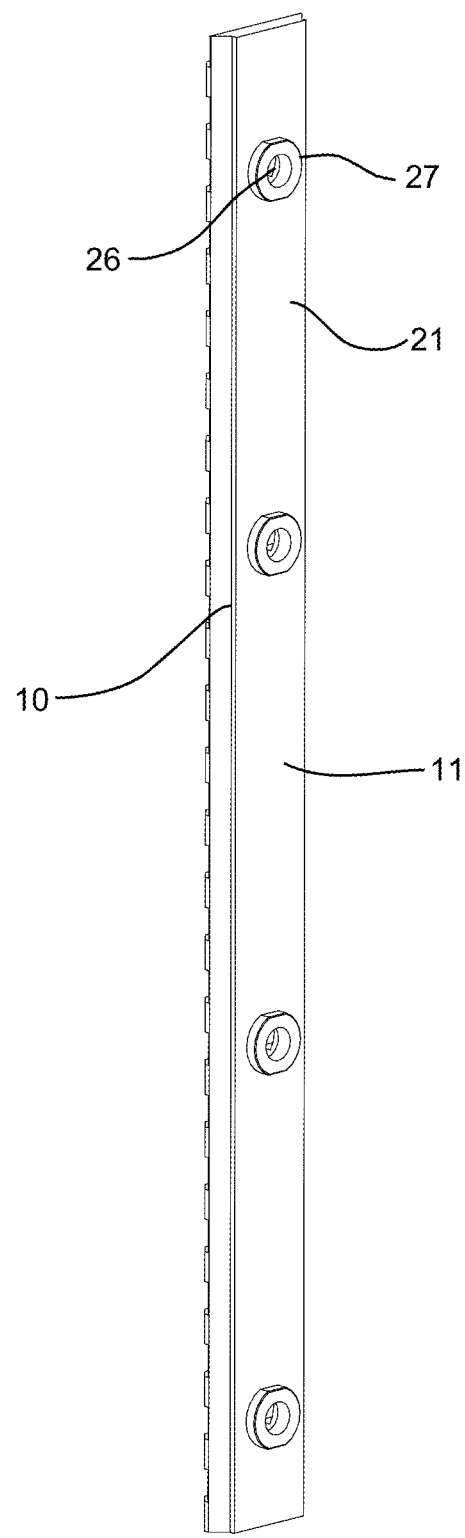
FIG. 12 is a rear perspective view of a second configuration of the mounting rail of FIG. 9.
Figure 13:
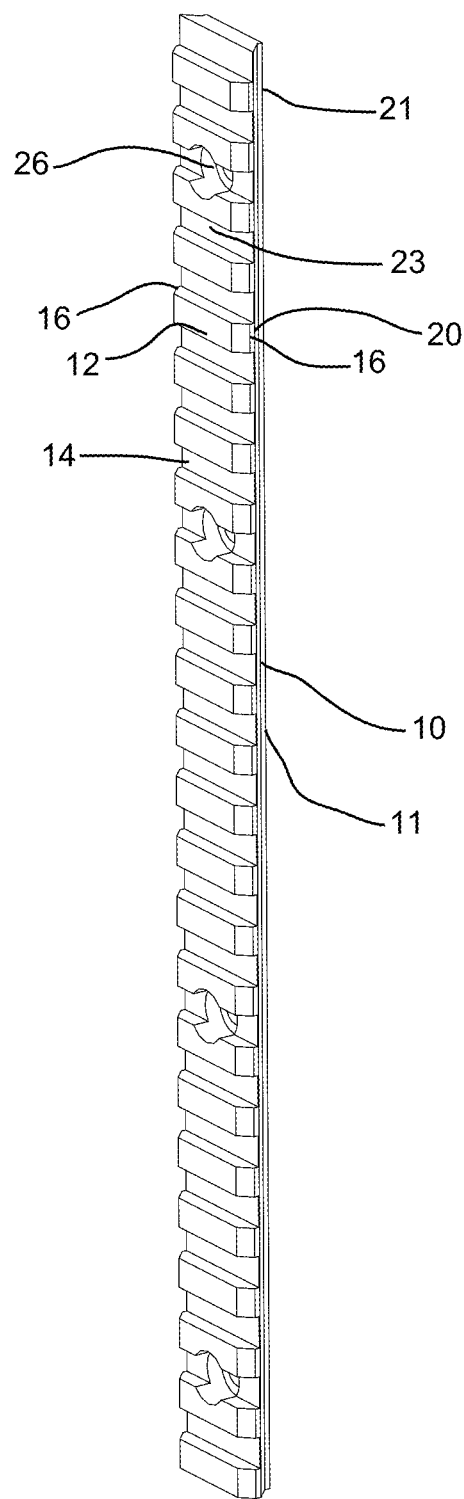
FIG. 13 is a perspective view of the mounting rail of FIG. 12.

Referring to FIG. 1, there is shown a mounting rail 10 configured for mounting to a weight rack 100 as shown in FIG. 8. The weight rack 100 in FIG. 8 includes various frame members 110, including frame members that are vertical and horizontal, as well as various angled frame members that are vertically and/or horizontally angled. The frame members 110 are connected together to form a frame for use in a weightlifting exercise. As described herein, the mounting rail 10 is configured for attachment to any of these frame members 110 for connection of an accessory.

Figure 6:
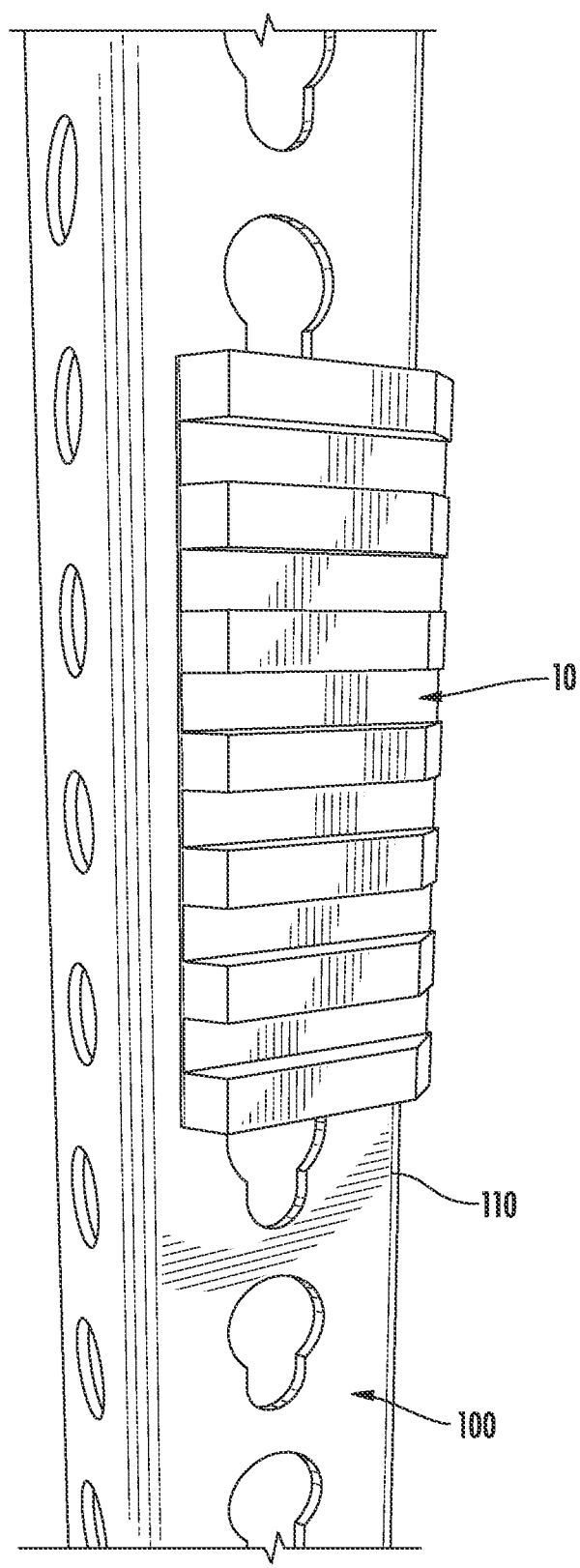
FIG. 6 is a perspective view of the mounting rail of FIG. 1 mounted on one embodiment of a weight rack according to aspects of the disclosure.
Figure 7:
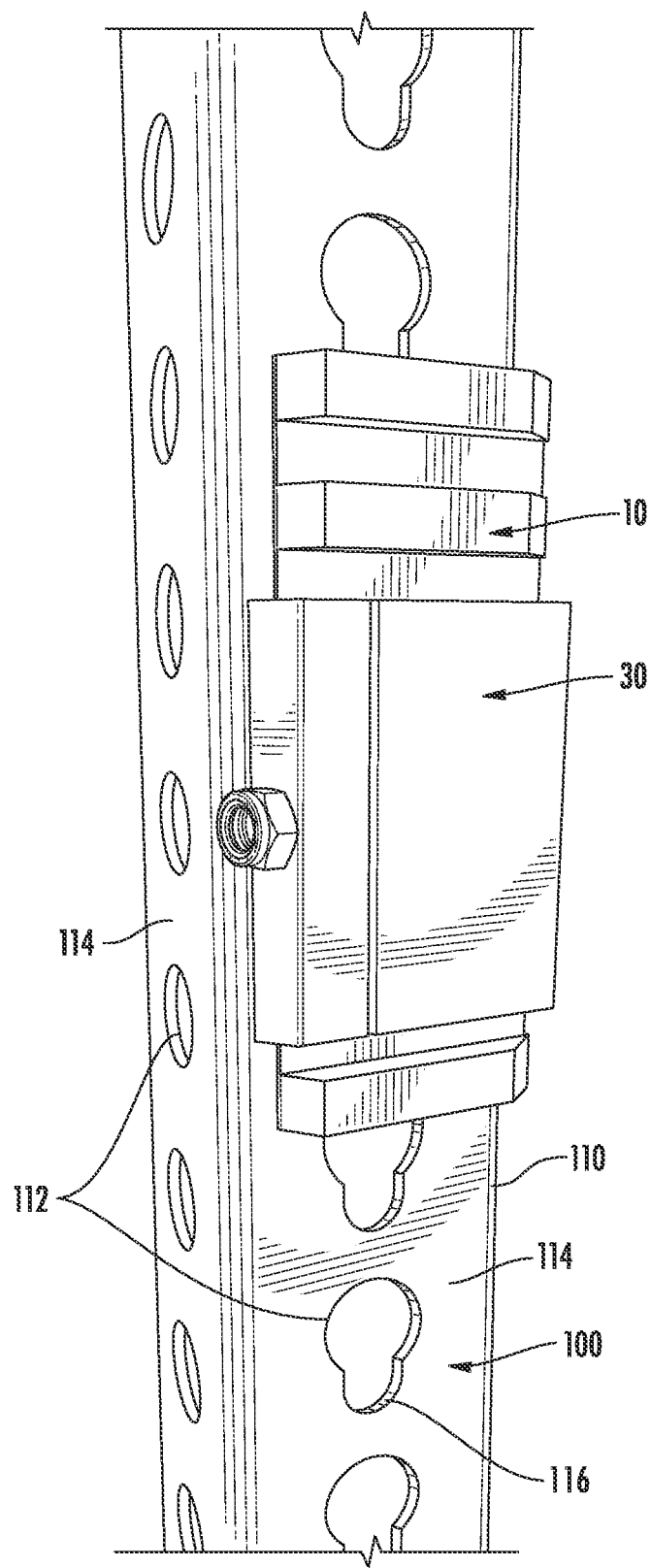
FIG. 7 is a perspective view of the mounting rail and the weight rack of FIG. 6 with the accessory of FIG. 2 mounted on the mounting rail.

The mounting rail 10 is shown connected to a frame member 110 of a weight rack 100 in FIG. 6, and FIG. 7 shows an accessory 30 connected to the mounting rail 10. FIG. 8 shows an example of an assembled weight rack 100. Each frame member 110 in FIGS. 1 and 6-8 includes a plurality of holes 112 extending through some or all of the walls 114 of the frame member 110. At least some of the holes 112 may have a key-shape with a narrower slot or cut-out 116 extending outward from the circular periphery, as shown in FIGS. 7-8, typically at the bottom of the hole 112. The mounting rail 10 may be connected to the weight rack 100 using any of a variety of removable and permanent connection structures. In one embodiment, the mounting rail 10 may be mounted using fasteners such as threaded bolts, keyed pins, etc., that may be separate from the rail 10 (e.g., by extending through holes in the rail 10 and the frame member 110) and/or integrally connected to the rail 10 or the frame member 110 (e.g., a pin welded or otherwise fixed to the rail 10 that extends through a hole in the frame member 110). In another embodiment, the mounting rail 10 may be welded or otherwise bonded to the frame member 100 or elsewhere on the weight rack 100. FIGS. 6-7 illustrate the rail 10 mounted in a vertical orientation to a vertical frame member 110, but in other embodiments, the rail 10 may be mounted to a differently-oriented frame member 110 and/or in a different orientation that may or may not be along the length direction of the respective frame member 110 (e.g., transverse to the frame member 110). It is understood that other structures of the weight rack 100 may be suitable for connection to the mounting rail 10 and that multiple rails 10 connected separately to the weight rack 100 may be used for mounting the same or related accessories 30.

The mounting rail 10 in FIG. 1 has a base 11 with plurality of blocks or rail sections 12 extending or projecting therefrom, with the rail sections 12 separated by slots 14. The rail sections 12 in FIG. 1 are all substantially identical to each other in height (i.e., the distance from the bottom of the adjacent slot 14 to the top 22 of the rail section 12), width (i.e., the lateral distance of extension of the rail section 12), length (i.e., the distance of extension of the rail section 12 along the longitudinal direction of the mounting rail 10), peripheral shape, and other dimensions, and are equally spaced along the length of the mounting rail 10. The same is true of the slots 14. In one embodiment, one or more of the rail sections 12 and/or slots 14 may have slightly different construction from the majority of the same, such as the rail sections 12 on the end, or where the rail sections 12 and/or the slots 14 interact with mounting structure for mounting the rail 10 on the weight rack 100, e.g., a fastener hole. Each rail section 12 has a profile with flanges or ridges 16 extending laterally outward from opposite lateral edges of the base 11 of the rail 10, having beveled surfaces 18 on top and bottom at the end of each flange 16, and with an undercut 20 beneath each flange 16. The bottom beveled surface 18 may be a continuous surface of the base 11 that extends along the length of the rail 10 and connects to all of the rail sections 12, with the top beveled surfaces 18 being formed by ends of the rail sections 12. The top 22 and the front and rear surfaces 24 of each rail section 12 are flat, and the rail sections 12 are connected at the bottom to the base 11. The slots 14 are all square shaped and are bounded on front and rear sides by rail sections 12 and on the bottom by the base 11, with the top of each slot 14 being open for receiving a portion of the accessory during mounting. The base 11 is configured for connection to a frame member 110 of a weight rack 100 as described herein.

FIGS. 9-17 illustrate additional embodiments of mounting rails 10 that have rail sections 12 and slots 14 configured similarly to the mounting rail 10 of FIGS. 1-7. FIGS. 9-17 illustrate two different configurations of mounting rails 10, including a first configuration shown in FIGS. 9-11 and 14 (the lower portion of the mounting rail 10 in FIGS. 9-10) and a second configuration shown in FIGS. 9-10, 12-13, and 15-17 (the upper portion of the mounting rail 10 in FIGS. 9-10). These two configurations of mounting rails 10 have different mounting structures for mounting the rails 10 on the weight rack 100. Each mounting rail 10 may have a single mounting structure or a combination of different mounting structures.

Figure 14:
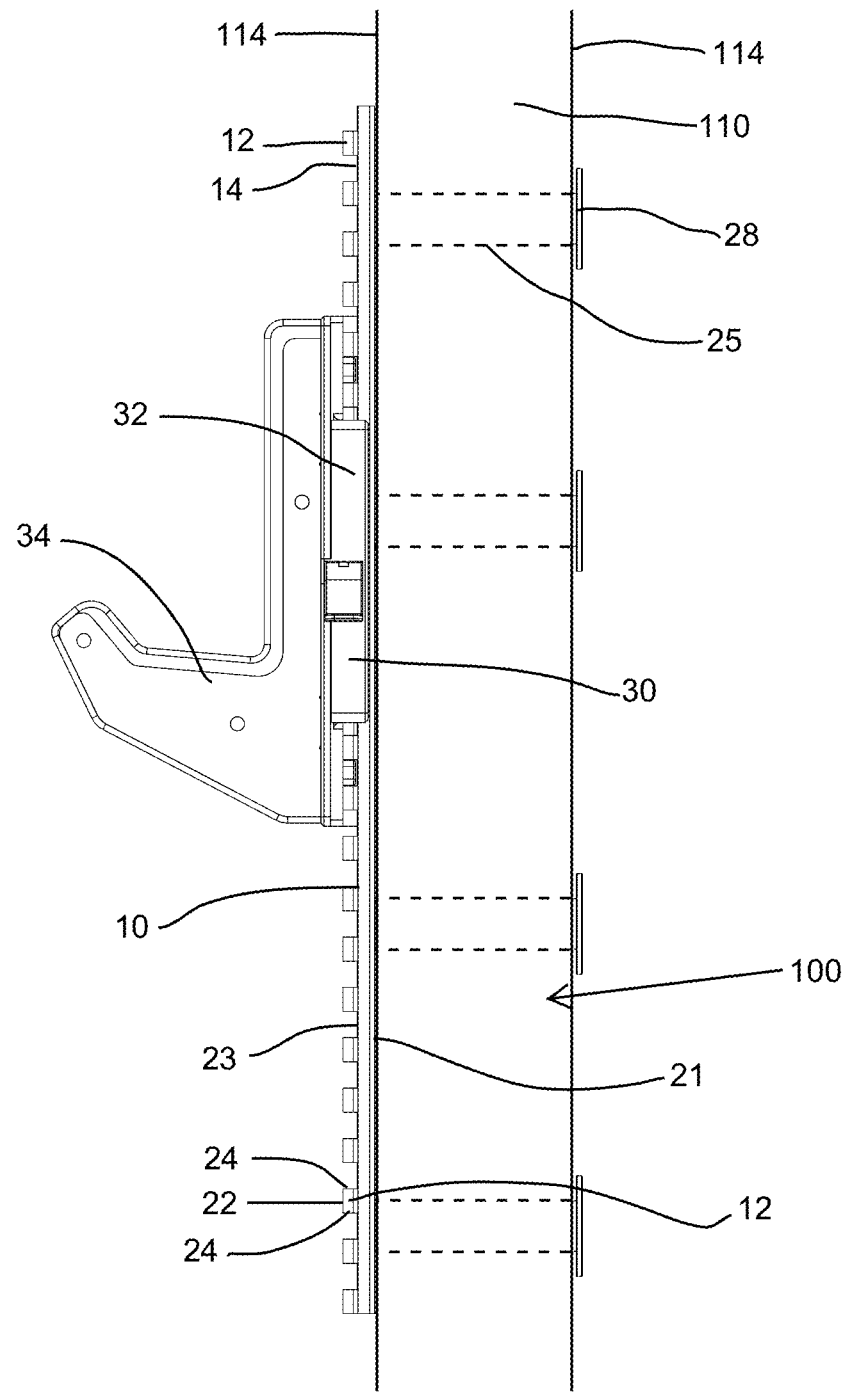
FIG. 14 is a side view of the first configuration of the mounting rail of FIG. 9 mounted on a weight rack frame member, with the accessory mounted on the mounting rail.

The first configuration of the mounting rail 10 includes mounting pegs 25 that extend from the inner surface 21 of the mounting rail 10, opposite the outer surface 23 on which the rail sections 12 are positioned. The pegs 25 are fixedly connected to the mounting rail 10 in one embodiment, such as by fasteners (not shown) received through threaded apertures 26 that extend through the mounting rail 10, or by welding or other bonding material/technique. The inner surface 21 of the mounting rail 10 has projections 27 that engage the ends of the mounting pegs 25, and the apertures 26 extend through the projections 27. Each mounting peg 25 has an enlarged head 28 that is sized to fit through the holes 112 in a frame member 110 of a weight rack 100 as described herein, but with a larger peripheral shape than the slot 116 in the key-shape holes 112. The body of the peg 25 itself is dimensioned to fit within the slots 116 in the key shaped holes 112. In this configuration, the pegs 25 can be inserted through the key-shaped holes 112 and then lowered so that the pegs 25 sit within the slots 116 and the heads 28 engage the opposite surface of the frame member 110 around the slot 116 to hold the mounting rail 10 in position. This mounting configuration is shown in FIG. 14. When the mounting rail 10 is connected to the frame member 110, the projections 27 may be received within the holes 112 on the frame member 110 to engage the peripheries of the holes 112, stabilizing and strengthening the connection. The projections 27 may also therefore be dimensioned to fit within the slots 116 in the holes 112 of the frame member 110.

Figure 15:
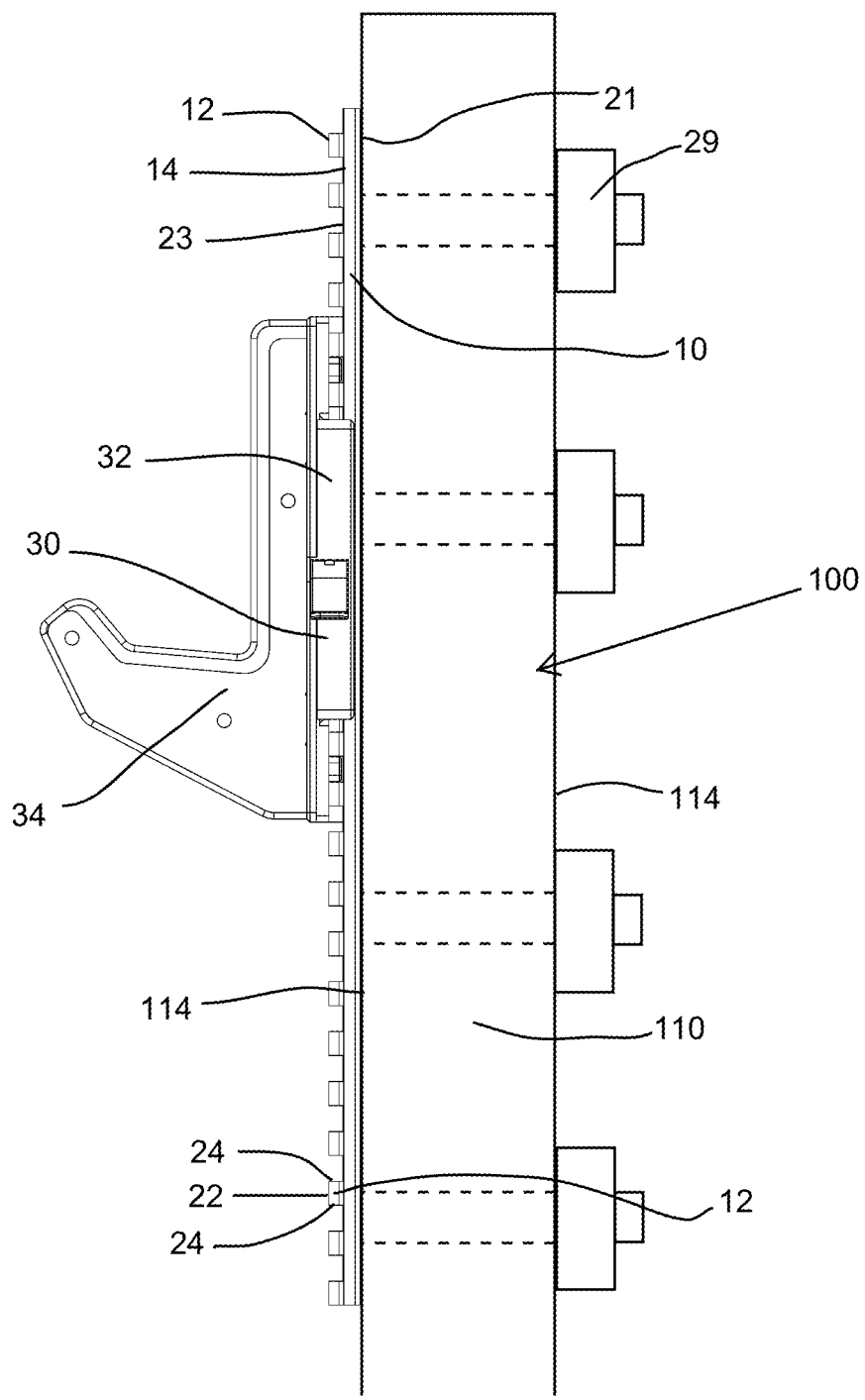
FIG. 15 is a side view of the second configuration of the mounting rail of FIG. 9 mounted on a weight rack frame member, with the accessory mounted on the mounting rail.
Figure 16:
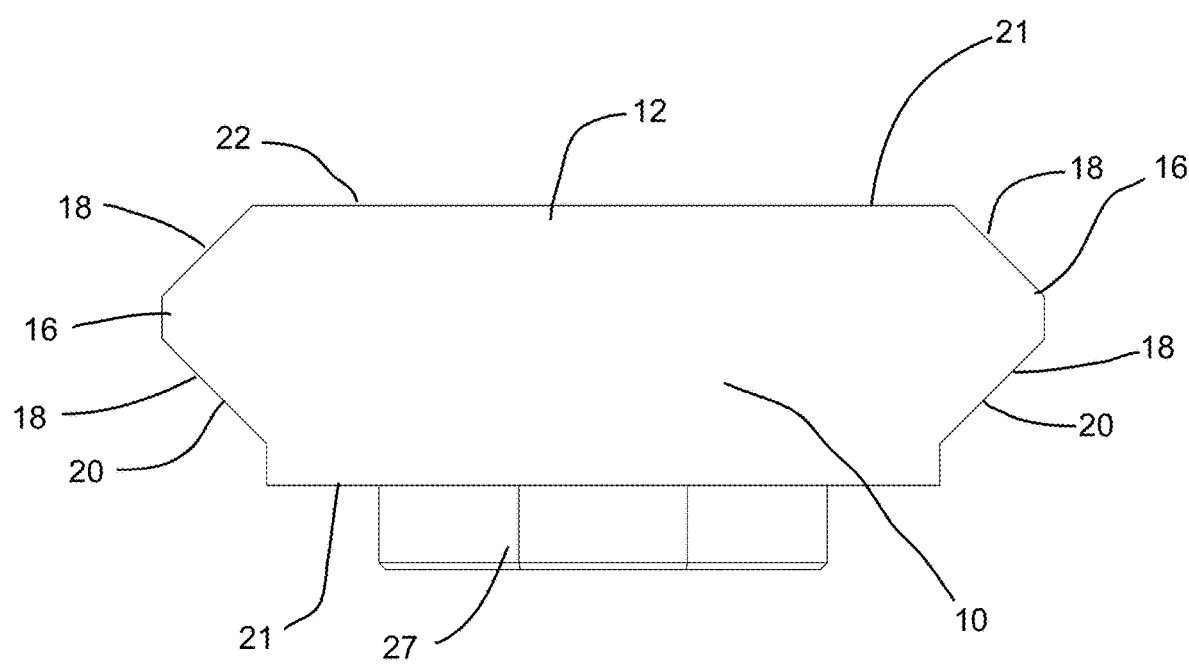
FIG. 16 is a top view of the mounting rail of FIG. 9.
Figure 17:
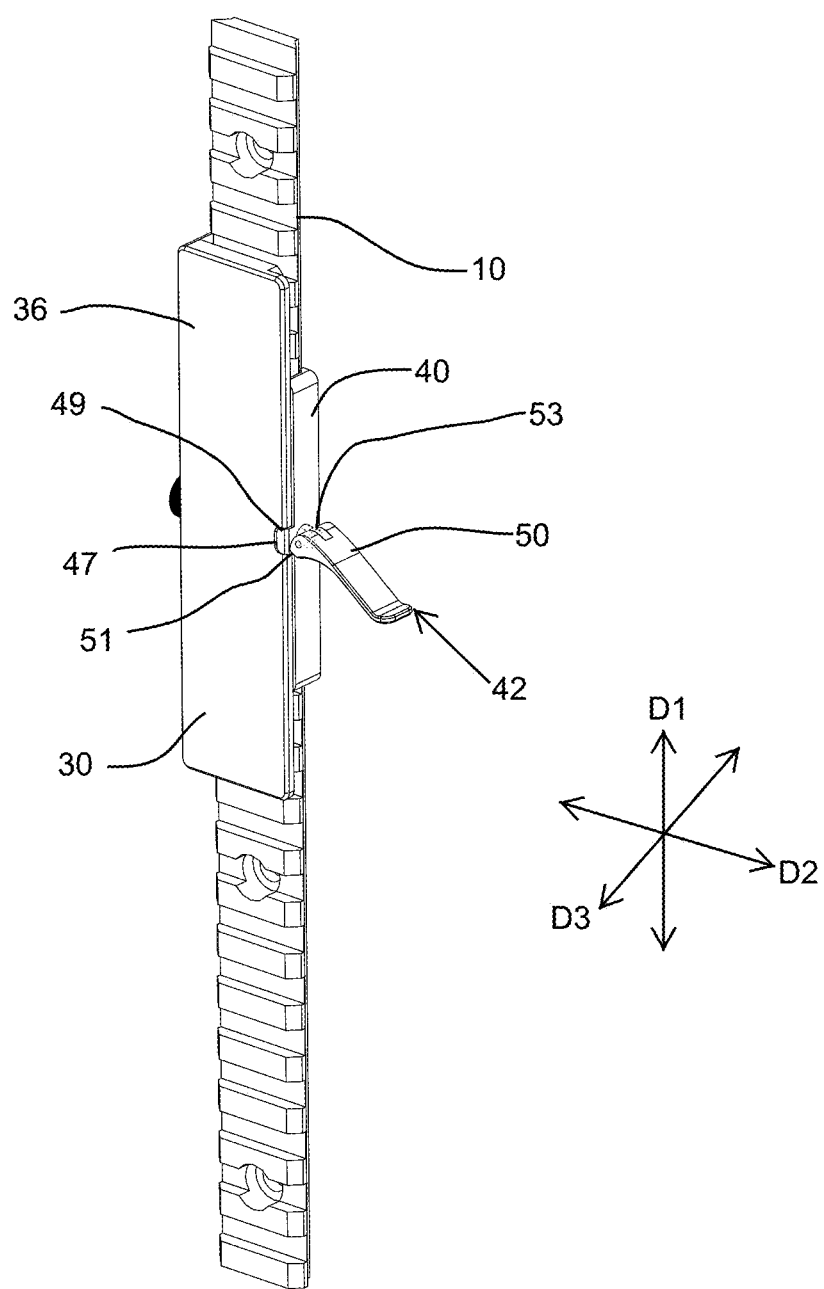
FIG. 17 is a perspective view of the accessory of FIG. 9 mounted on the mounting rail.
Figure 18:
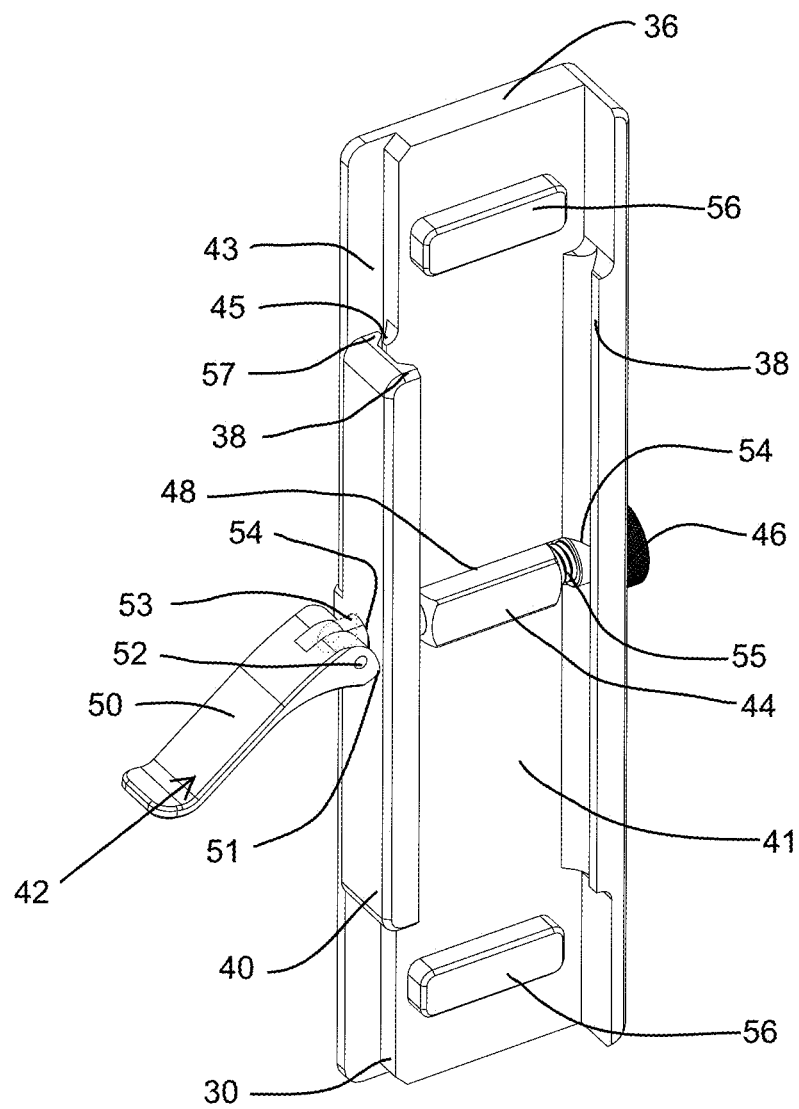
FIG. 18 is a rear perspective view of the accessory of FIG. 9.
Figure 19:
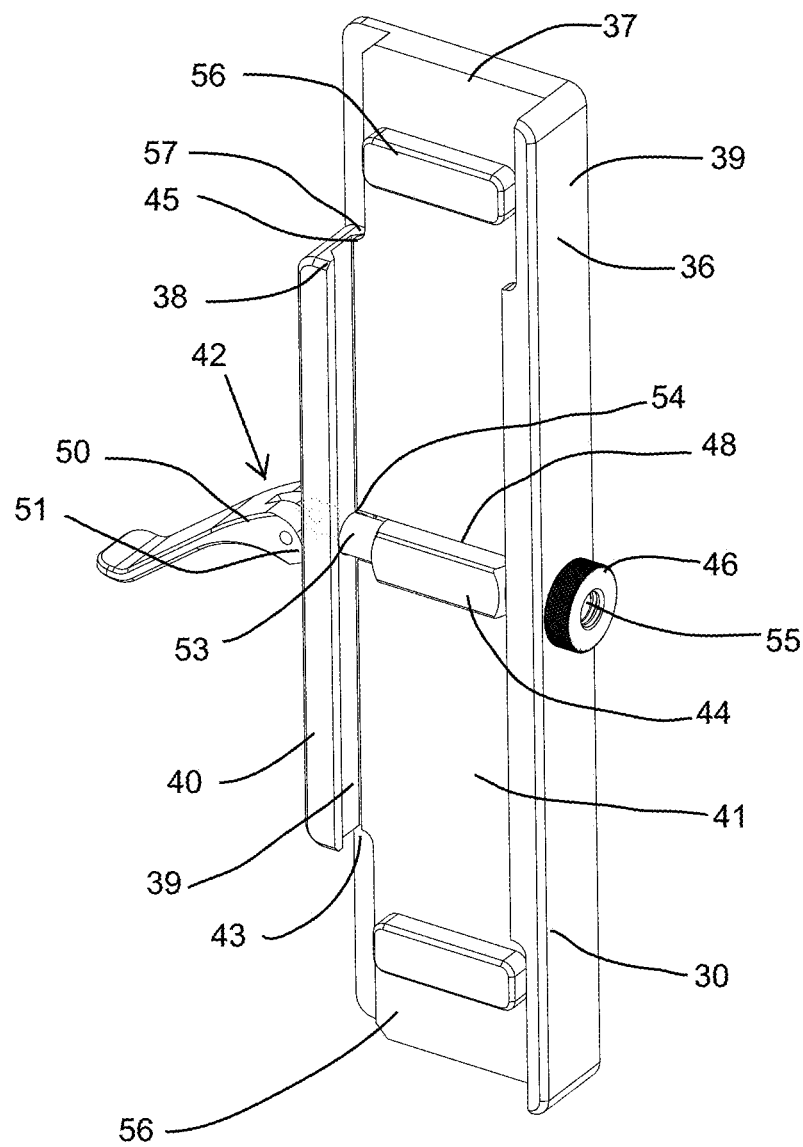
FIG. 19 is a rear perspective view of the accessory of FIG. 9.

In another embodiment, removable connecting members 29 (e.g., threaded fasteners or mounting pegs) may be used to connect the mounting rail 10 to the frame member 110. Such removable connecting members 29 may be removably connected to the mounting rail 10, such as by a threaded connection and/or may be fixedly connected to the mounting rail 10 with a retaining member (e.g., a nut, pin, etc.) used to removably connect the removable connecting member 29 to the frame member 110. The second configuration of the mounting rail 10 in FIGS. 9-10, 12-13, and 15-17 is configured for use with removable connecting members 29, as shown in FIG. 15. In this configuration, the mounting rail 10 has threaded apertures 26 that extend through projections 27 on the inner surface 21, such that the connecting members 29 are received through the apertures 26 to connect to the mounting rail 10. When the mounting rail 10 is connected to the frame member 110, the projections 27 may be received within the holes 112 on the frame member 110 to engage the peripheries of the holes 112, stabilizing and strengthening the connection. The projections 27 in both configurations of the mounting rail 10 illustrated in FIGS. 9-17 have generally circular shapes with flattened surfaces 27A on opposite sides thereof. The connection structure in the second configuration of the mounting rail in FIGS. 9-10, 12-13, and 15-17 may be used to connect to circular or key-shaped holes 112, among other shapes. Other configurations using removable connection members 29 may be used in other embodiments.

One embodiment of an accessory 30 for releasable mounting on the mounting rail 10 is shown in FIGS. 2-5. In general, each accessory 30 may have a mounting portion 32 and a functional portion 34 that is connected to the mounting portion 32 and is configured for use in a weightlifting exercise. In one embodiment, the mounting rail 10, the accessory 30 (including the mounting portion 32 and the functional portion 34), and/or the assembly including the mounting rail 10 and the accessory 30 may individually or collectively be configured to support a minimum weight of at least 1000 pounds exerted on the accessory 30. For example, the assembly including the mounting rail 10 and the accessory 30, when connected to the weight rack 100, may be capable of supporting at least 1000 pounds exerted (vertically or otherwise) on the functional portion 34 of the accessory 30. The accessory 30 in FIGS. 2-5 has a functional portion 34 in the form of a bumper or pad. In other embodiments, the accessory 30 may have a functional portion 34 configured for use in a weightlifting exercise or in conjunction with weightlifting exercises, such as a support or storage apparatus. Examples of such functional portions 34 include J-cups, Monolift attachments, lever arms having various different orientations and pivot points, spotter arms, strap safeties, an adjustable pull-up bar, a bench centering dock, an attachment for a seat positioned for a weightlifting exercise, a modular moveable carriage, pivoting attachments (which may be connected to such a carriage), and attachment points for items such as straps or resistance bands, among other examples, some of which are shown in FIGS. 17-34.

The mounting portion 32 is configured for mounting on the rail 10 by engaging the rail sections 12, including on the flanges 16, the top 22, and/or the front and rear surfaces 24. In general, the mounting portion 32 has a fixed portion 36 with a first lip 38 that engages one or more flanges 16 of one or more rail sections 12 on one lateral side of the rail 10 and extends into the undercuts 20 beneath the flanges 16, and a moveable portion 40 with a second lip 38 that engages one or more flanges 16 of one or more rail sections 12 on the opposite lateral side of the rail 10 and extends into the undercuts 20 beneath the respective flanges 16. Collectively, the fixed portion 36 and the moveable portion 40 define a channel 41 on the rear side of the mounting portion 32 that receives a portion of the mounting rail 10, including portions of a plurality of the rail sections 12, therein. The mounting portion 32 in this configuration includes an outer wall 37 (defined by the fixed portion 36) with two side walls 39 (defined by the fixed portion 36 and the moveable portion 40, respectively) extending transversely from the outer wall 37 and lips 38 extending laterally inward toward each other from the ends of the side walls 39, with the channel 41 being defined between the outer wall 37, the side walls 39, and the lips 38. In this configuration, the flanges 16 of the rail sections 12 are received between the lips 38 and the outer wall 37. The mounting portion 32 further includes a locking mechanism 42 configured to press the moveable portion 40 against the rail sections 12 such that the lips 38 of the fixed portion 36 and the moveable portion 40 tightly engage the flanges 16 of the rail section(s) 12.

Figure 5:
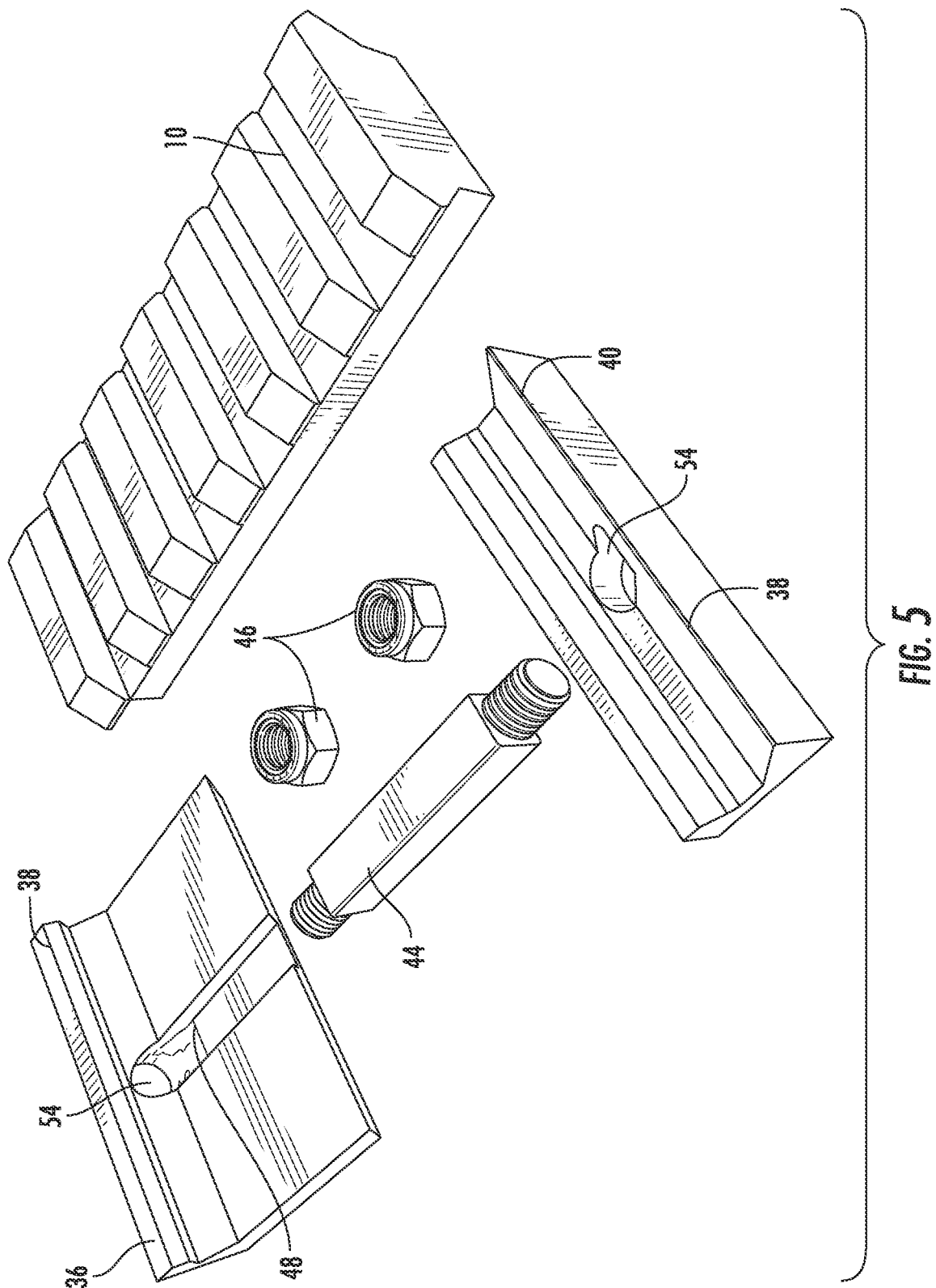
FIG. 5 is a perspective view of the accessory and the mounting rail of FIG. 2, with the accessory disconnected from the mounting rail and disassembled.

The mounting portion 32 further includes one or more pegs 44 received in one or more of the slots 14 to resist movement of the accessory 30 along the rail 10. The peg 44 in FIGS. 2-5 is threaded on both ends and also forms a portion of the locking mechanism 42. The central body of the peg 44 is dimensioned the same as the standard dimensions of the slot 14 to fill the slot 14 completely and resist even small axial movements with respect to the mounting rail 10, and the ends of the peg 44 are threaded and extend through holes 54 in the fixed portion 36 and the moveable portion 40 of the mounting portion 32. Tightening of a nut 46 on the end of the peg 44 at the moveable portion 40 creates tension to compress the moveable portion 40 and the fixed portion 36 together, thereby functioning as the locking mechanism 42. It is understood that in this embodiment, only one end of the peg 44 may be threaded, and the other end may have a fixed head (e.g., a typical bolt). The fixed portion 36 may have a groove 48 on the underside to receive a portion of the peg 44, as shown in FIG. 5. In another embodiment, the peg 44 may be engaged with only one of the fixed portion 36 and the moveable portion 40. In a further embodiment, a different locking mechanism 42 may be used in connection with the peg 44, such as a lever with a cam surface that bears on the mounting portion 32 to press the fixed portion 36 and the moveable portion 40 together, as shown in FIGS. 17-34 and described herein.

FIGS. 17-26 illustrate another embodiment of an accessory 30 for connection to a mounting rail 10 as described herein. The accessory 30 in FIGS. 17-26 is illustrated in some configurations with a functional portion 34 that includes a J-cup weight support 60 fixedly connected to the mounting portion 32. The connection of the functional portion 34 to the mounting portion 32 may be accomplished by various connection techniques, including welding or other bonding techniques, mechanical connection techniques (e.g., interlocking structures, fasteners, interference fit, etc.), and other such techniques, or combinations thereof. The J-cup weight support 60 is shown in greater detail in FIG. 26 and has a hooked shape that defines a notch 61 configured for receiving a portion of a weight or other object to support the object and hold the object at an elevated position. Other configurations of J-cup weight supports 60 may be used in other embodiments. In general, the accessory 30 and the mounting rail 10 are described herein with respect to a longitudinal (length) direction D1 along the direction of elongation of the mounting rail 10 and the mounting portion 32, a lateral (width) direction D2 perpendicular to the longitudinal direction D1, and a transverse direction D3 extending outwardly and inwardly perpendicular to the longitudinal and lateral directions D1, D2, which are shown for reference in FIG. 17. It is understood that these directions apply to the other embodiments discussed herein as well.

The accessory 30 of FIGS. 17-26 has a fixed portion 36 and a moveable portion 40, each having a side wall 39 extending in the transverse direction and a lip 38 extending laterally inward from the side wall 39 for engaging the flanges 16 of the rail sections 12. The accessory 30 of FIGS. 17-26 also has a locking mechanism 42 configured for moving the moveable portion 40 toward the fixed portion 36 so the moveable portion 40 and the fixed portion 36 engage the rail sections 12, and a peg 44 that is received within a slot 14 of the mounting rail 10 to engage the rail sections 12. The moveable portion 40 in this embodiment (as in the embodiment of FIGS. 1-7) may be considered to be moveable between a locked position, where the moveable portion 40 and the fixed portion 36 engage a plurality of the rail sections 12 to retain the accessory 30 in connection with the mounting rail 10, and a release position, where the accessory 30 is removable from the mounting rail 10. In this embodiment, in the release position, the space between the lips 38 of the moveable portion 40 and the fixed portion 36 is sufficient to permit the flanges 16 of the rail sections 12 to pass between the lips 38 and the mounting rail 10 to be disengaged from the accessory 30 by lifting the accessory 30 in the transverse direction. The moveable portion 40 in the embodiment of FIGS. 17-26 (as in the embodiment of FIGS. 1-7) moves by sliding laterally with respect to the fixed portion 36. The engagement of the moveable portion 40, the fixed portion 36, and the peg 44 with the rail sections 12 of the mounting rail 10 resists movement of the accessory 30 in all directions with respect to the mounting rail 10. It is understood that tightening or loosening (or removal) of one of the nuts 46 in the embodiment of FIGS. 1-7 may be considered to be moving the locking mechanism 42 between the release position and the locking position. The accessory 30 in FIGS. 17-26 includes numerous additional components and features in common with the accessory 30 in FIGS. 1-7, and it is understood that such components and features may not be described herein again in detail with respect to the embodiment of FIGS. 17-26.

In the embodiment of FIGS. 17-26, the moveable portion 40 has a longitudinal length that is smaller than the length of the fixed portion 36, and the fixed portion 36 has a recess 43 that receives a portion of the moveable portion 40 therein. The recess 43 extends inward from one of the lateral edges of the fixed portion 36, and the fixed portion 36 has a retaining lip 45 that extends over the recess 43 and engages a complementary retaining lip 57 on the moveable portion 40 to retain the fixed portion 36 and the moveable portion 40 in connection with each other. In one embodiment, the range of lateral motion of the moveable portion 40 with respect to the fixed portion 36 is not sufficient so that the retaining lips 45, 57 clear each other, and thus, the moveable portion 40 does not separate from the fixed portion 36 in the release position through engagement of the retaining lips 45, 57. The fixed portion 36 also includes a notch 47 that extends inward from the lateral edge of the fixed portion 36 and receives a protrusion 49 on the moveable portion 40. The engagement between the protrusion 49 and the notch 47 resists movement of the moveable portion 40 in the longitudinal direction with respect to the fixed portion 36. The notch 47 has sufficient lateral width that the protrusion 49 can move laterally within the notch 47 over the entire range of lateral movement of the moveable portion 40 between the locked position and the release position. In one embodiment, the protrusion 49 engages the terminal end of the notch 47 in the locked position.

Figure 20:
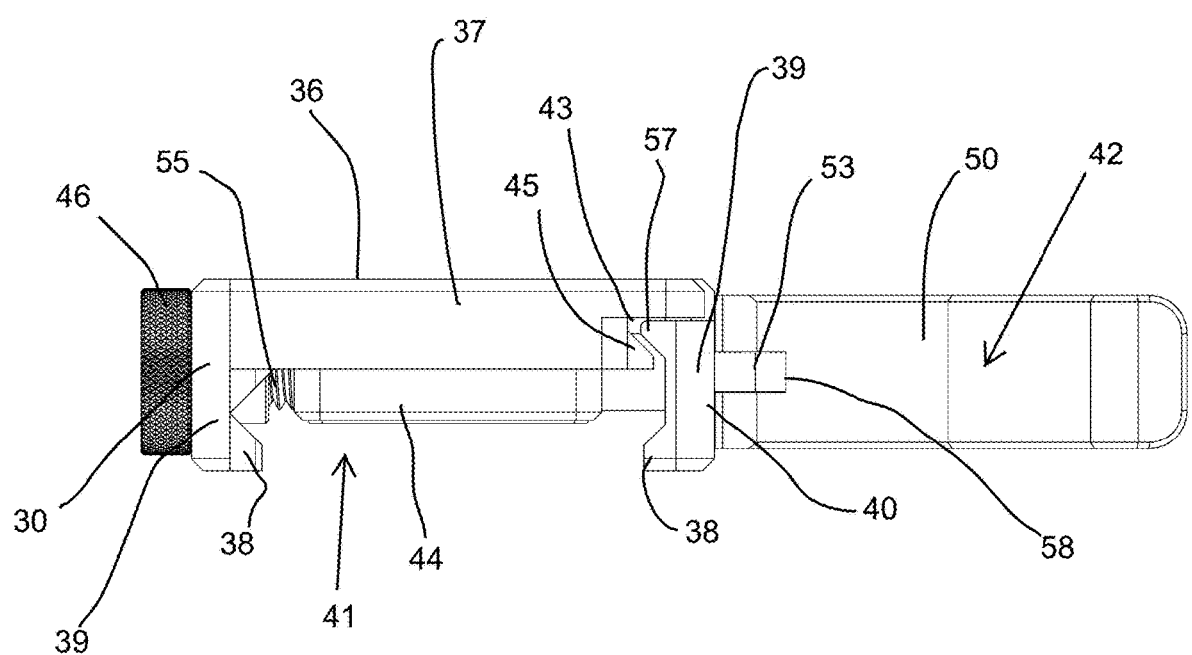
FIG. 20 is a bottom view of the accessory of FIG. 9.
Figure 21:
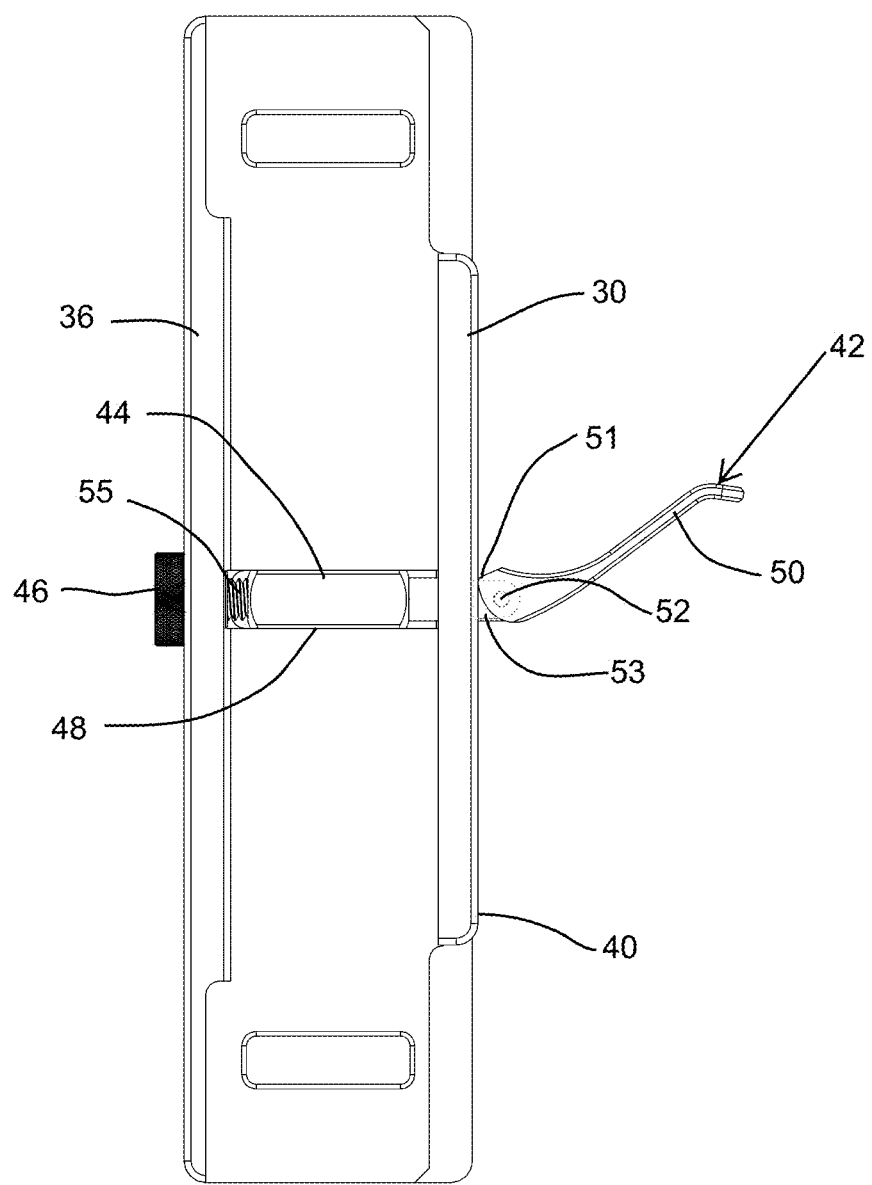
FIG. 21 is a rear view of the accessory of FIG. 9, with a locking mechanism of the accessory shown in a release position.
Figure 22:
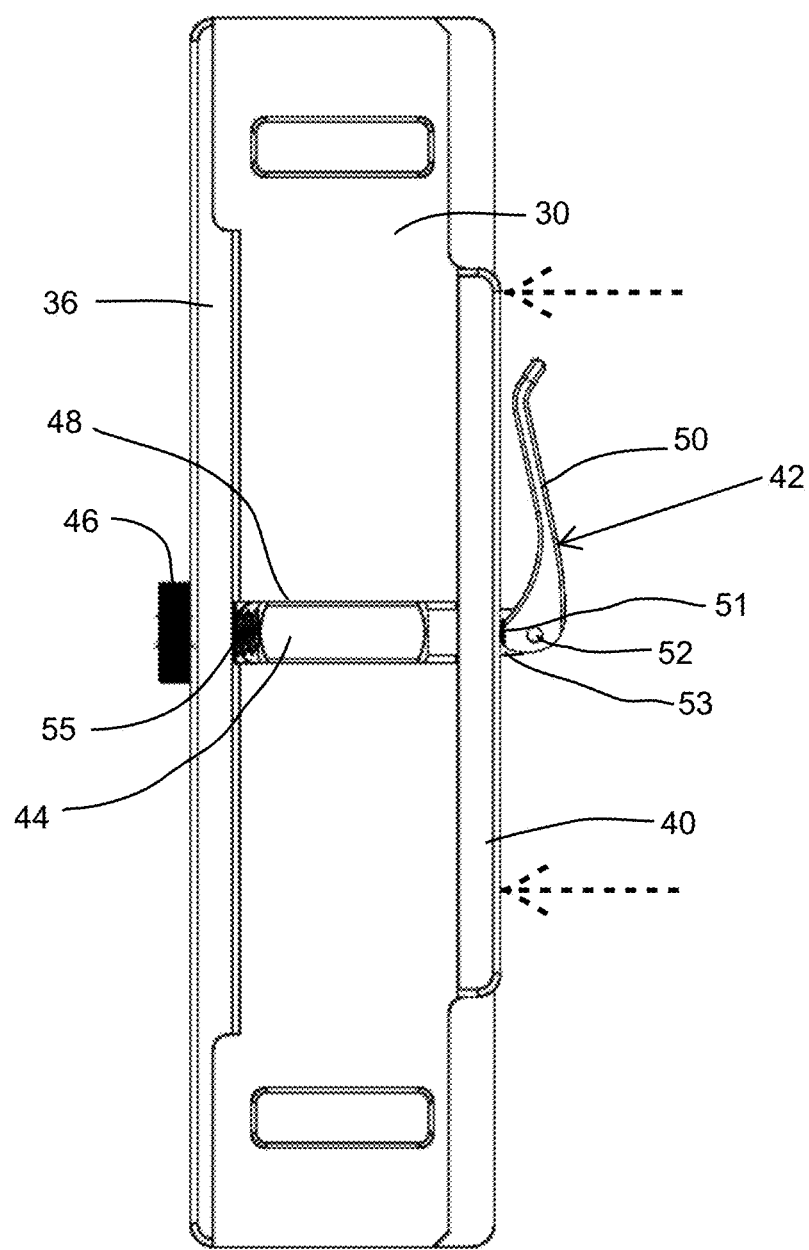
FIG. 22 is a rear view of the accessory of FIG. 9, with the locking mechanism of the accessory shown in a locked position.
Figure 23:
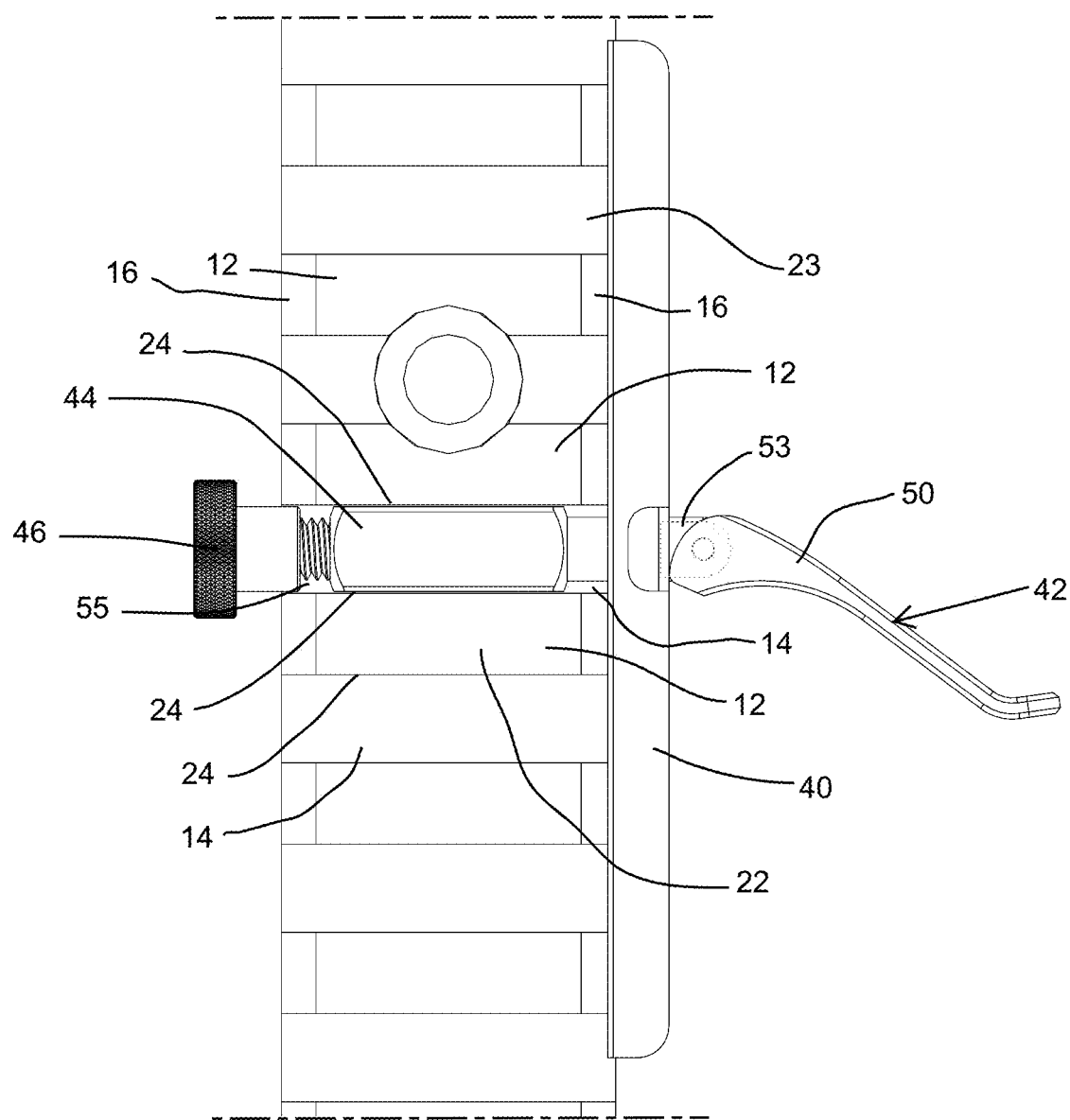
FIG. 23 is a broken away front view of the mounting rail and a portion of the accessory of FIG. 9.
Figure 24:
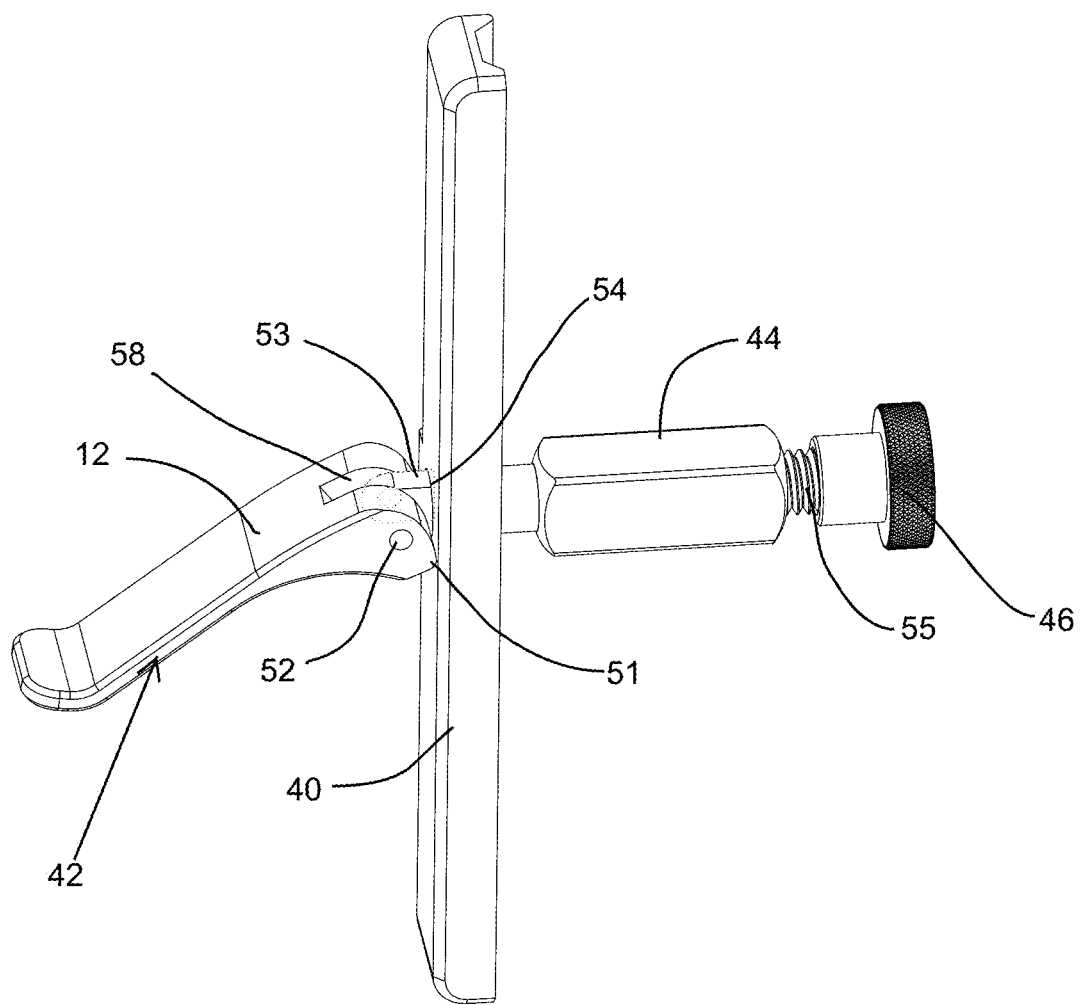
FIG. 24 is a rear perspective view of a first portion of the accessory of FIG. 9.
Figure 25:
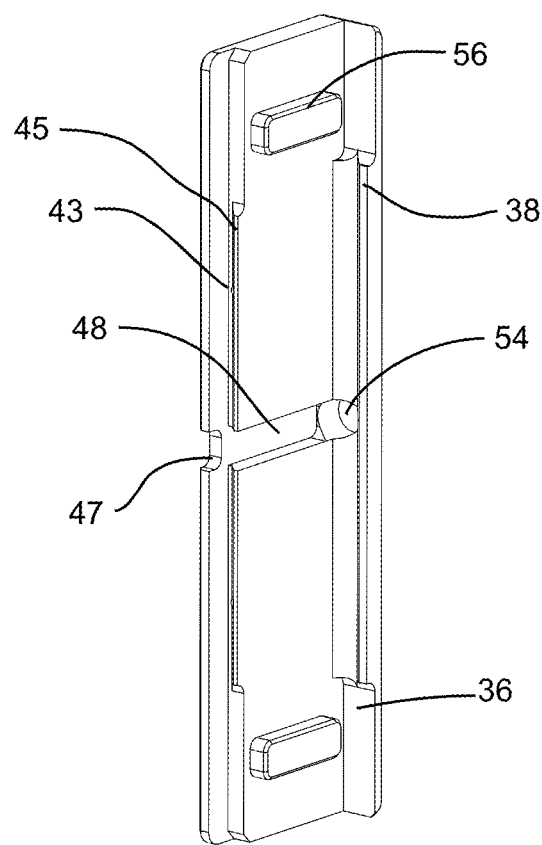
FIG. 25 is a rear perspective view of a second portion of the accessory of FIG. 9.
Figure 26:
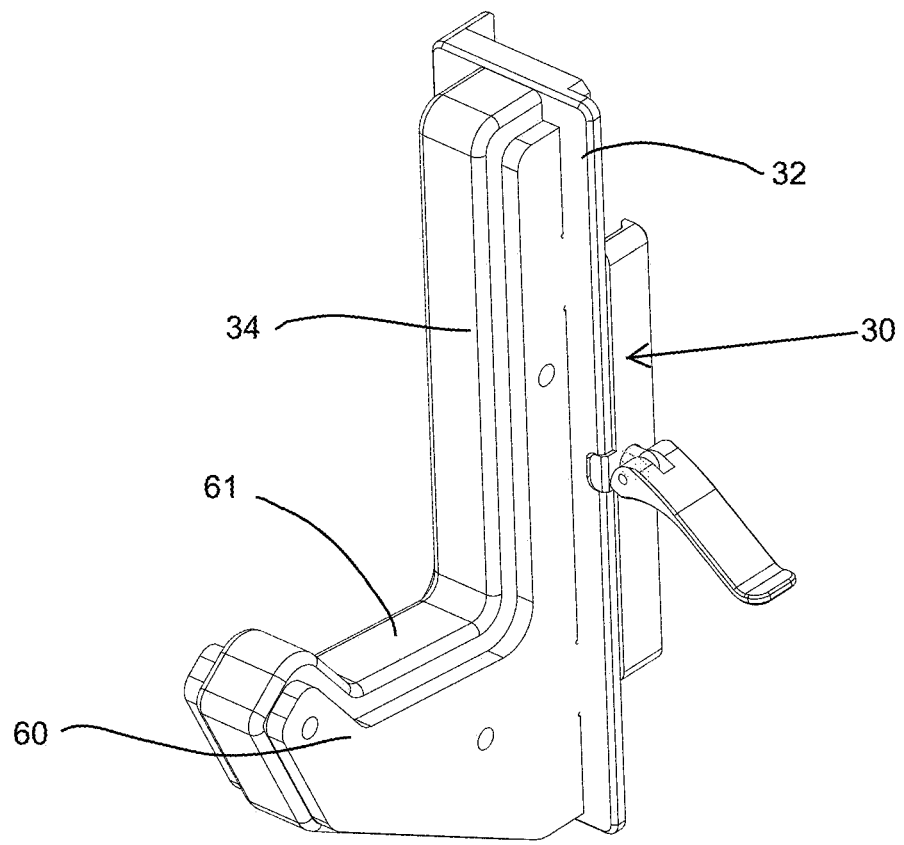
FIG. 26 is a perspective view of the accessory with the functional portion of FIG. 10.

The locking mechanism 42 in the embodiment of FIGS. 17-26 uses a pivoting lever 50 that has a cam surface 51, such that pivoting the lever 50 causes the cam surface 51 to engage the moveable portion 40 to move the moveable portion 40 to the locked position. The lever 50 in FIGS. 17-26 is moveable by pivoting between a first or locked position, where the cam surface 51 engages the moveable portion 40 to retain the moveable portion 40 in the locked position, and a second or release position, where the lever 50 permits the moveable portion 40 to move to the release position. The cam surface 51 engages the moveable portion 40 to gradually push the moveable portion 40 laterally to the locked position when the lever 50 moves from the second position to the first position. FIG. 21 illustrates the lever 50 and the moveable portion 40 in the release positions, and FIG. 22 illustrates the lever 50 and the moveable portion 40 in the locked positions, with arrows in FIG. 22 illustrating movement of the moveable portion 40 from the release position to the locked position. The lever 50 is pivotable about a pivot connection 52 that is formed between the lever 50 and a pivot pin 53 that is connected to the peg 44 and extends through an opening 54 in the side wall 39 of the moveable portion 40. As shown in FIG. 20, the pivot pin 53 may be received in a slot 58 in the end of the lever to create the pivot connection 52 in one embodiment. In the embodiment of FIGS. 17-26, the pivot pin 53 is fixedly connected to one end of the peg 44, and a threaded pin 55 is fixedly connected to the opposite end of the peg 44 and extends through an opening 54 in the side wall 39 of the fixed portion 36, with a nut 46 threaded onto the threaded pin 55. In this configuration, moving the pivoting lever 50 to the locked position places tension on the peg 44. As in the embodiment of FIGS. 1-7, the peg 44 in FIGS. 17-26 sits within a groove 48 on the rear side of the fixed portion 36 and extends across the channel 41 defined between the fixed portion 36 and the moveable portion 40. The fixed portion 36 in this embodiment also has a plurality of ridges 56 on the rear side that extend into the channel 41 and engage additional slots 14 and rail sections 12 of the mounting rail 10 to provide additional resistance against axial movement. In another embodiment, the mounting portion 32 of the accessory 30 may include multiple locking mechanisms 42, such as a configuration where two pegs 44 are connected between the fixed portion 36 and the moveable portion 40, with a lever 50 or other locking mechanism configured to engage each peg 44.

Figure 27:
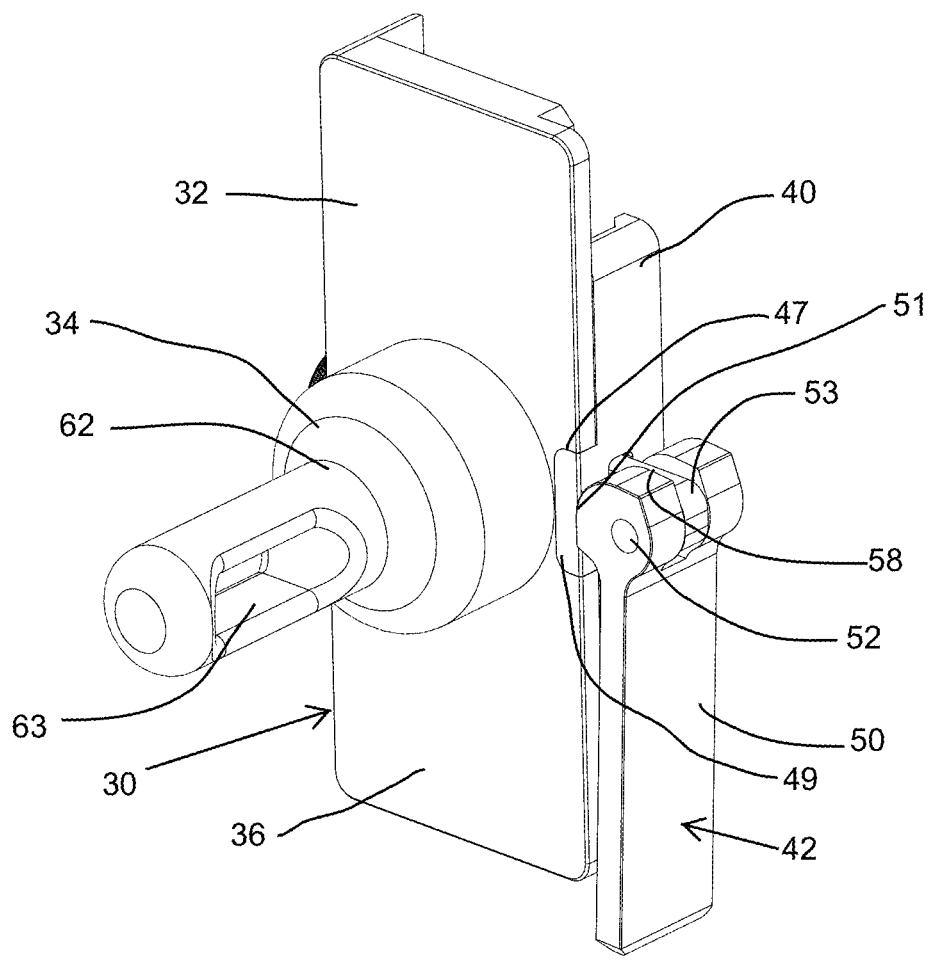
FIG. 27 is a perspective view of another embodiment of an accessory with a functional portion, according to aspects of the disclosure.
Figure 28:
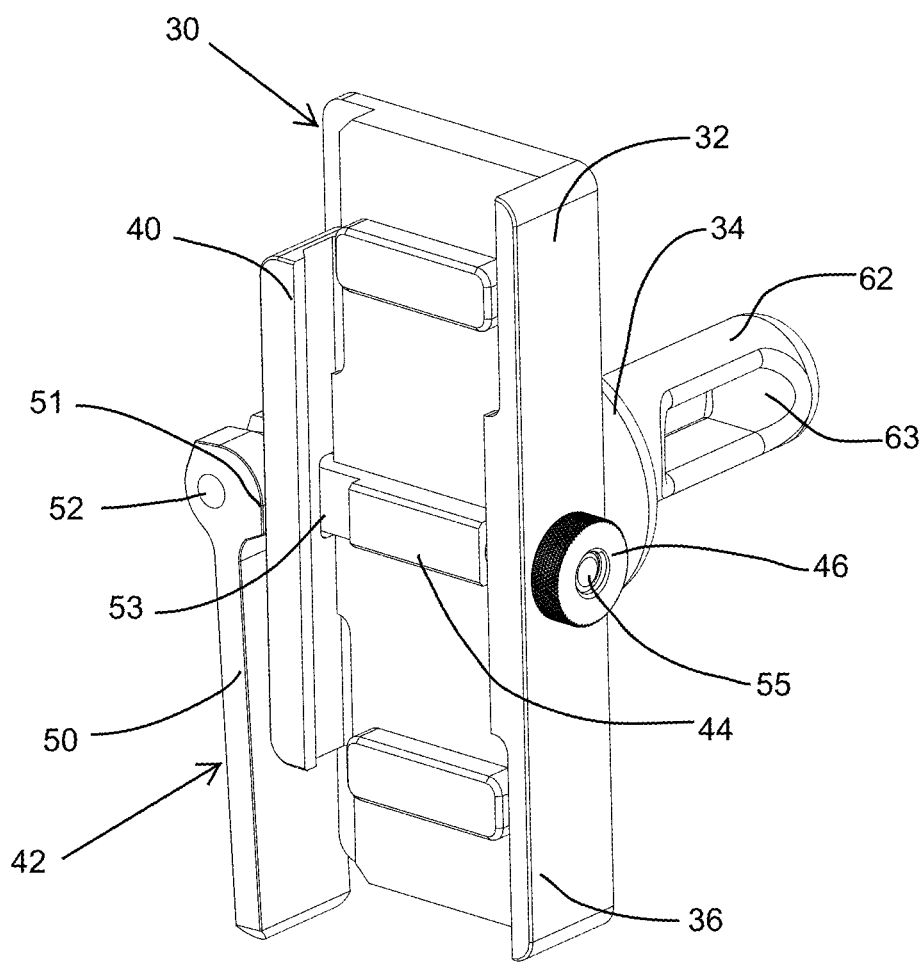
FIG. 28 is a rear perspective view of the accessory of FIG. 27.

FIGS. 27-34 illustrate another embodiment of an accessory 30 with a mounting portion 32 that is functionally similar or identical to the mounting portion 32 of the accessory 30 of FIGS. 17-26, with slight structural differences. It is understood that the accessory 30 of FIGS. 27-34 is described herein only with respect to the differences from the accessory 30 of FIGS. 17-26, and identical reference numbers are used to reference both embodiments. The mounting portion 32 of the accessory 30 in the embodiment of FIGS. 27-34 is provided with different longitudinal lengths in various configurations, based on the dimensions of the functional portion 34 that is connected thereto. For example, the mounting portion 32 in FIGS. 27-28 is shorter than that of the mounting portion 32 in FIGS. 17-26 and the mounting portion 32 in FIGS. 29-30. In all configurations of FIGS. 27-34, the longitudinal lengths of the notch 47 on the fixed portion 36 and the protrusion 49 on the moveable portion 40 are greater than those shown in FIGS. 17-26, with functionality being the same. Additionally, the lever 50 in FIGS. 27-34 has a different peripheral shape relative to the lever 50 in FIGS. 17-26, but functions in the same manner, using a cam surface 51 that engages the moveable portion 40 during pivoting of the lever 50 to move the moveable portion 40 to the locked position. The accessories 30 in FIGS. 27-34 have different embodiments of functional portions 34 connected to the mounting portion 32 thereof, which are described herein. It is understood that other embodiments of functional portions 34 may be used in other embodiments, including other embodiments described herein.

FIGS. 27-28 illustrate an accessory 30 with a functional portion 34 that includes an attachment post 62 that extends outward in the transverse direction and includes a receiver 63 for receiving a connecting member or other portion of another article to form a connection. The attachment post 62 in FIGS. 27-28 may be used for connection to a karabiner clip or similar structure in one embodiment. The receiver 63 in FIGS. 27-28 is configured as a closed aperture, but the receiver 63 may have an open configuration (e.g., a hook or C-shape) in another embodiment.

Figure 29:
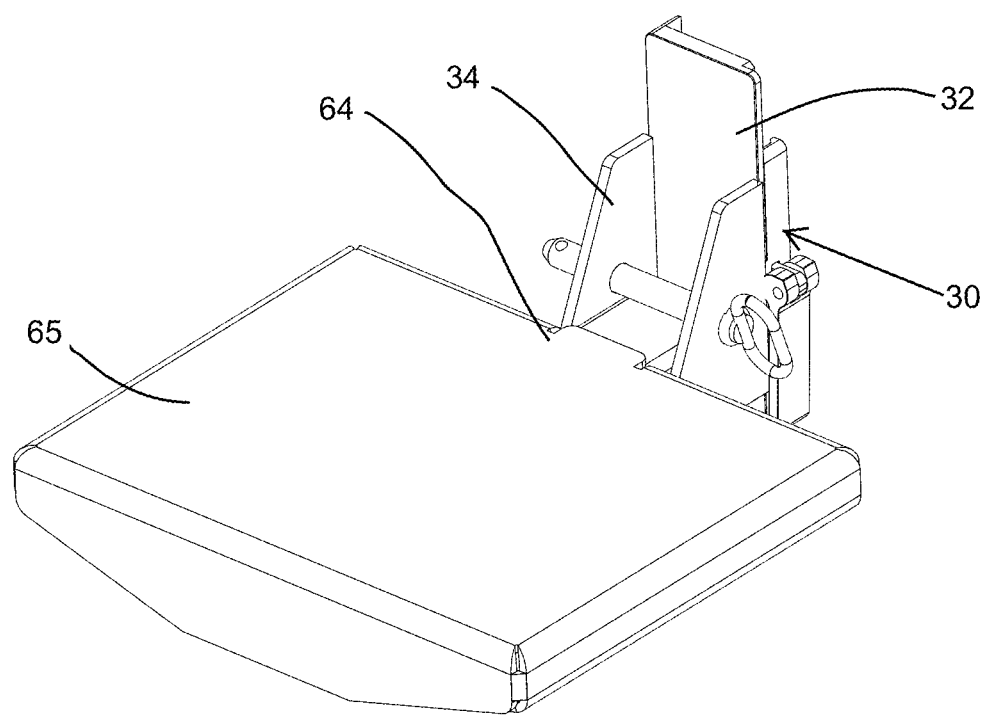
FIG. 29 is a perspective view of another embodiment of an accessory with a functional portion, according to aspects of the disclosure.
Figure 30:
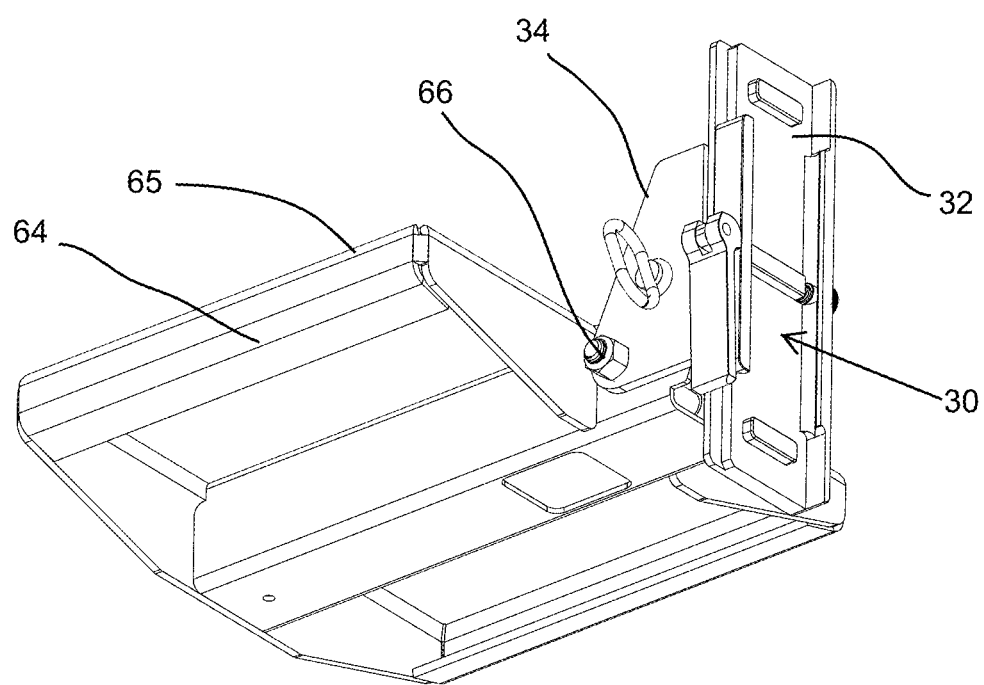
FIG. 30 is a rear perspective view of the accessory of FIG. 29.

FIGS. 29-30 illustrate an accessory 30 with a functional portion 34 that includes a pivotable spotter deck 64 for placement of a spotter's foot to allow the spotter to stand at an elevated position. The accessory 30 may be paired with another similar accessory in appropriate positions to provide two spotter decks to support both feet of the spotter. The spotter deck 64 includes a platform 65 that is pivotable upward about a pivot point 66 to move the platform 65 out of the way when not in use.

Figure 31:
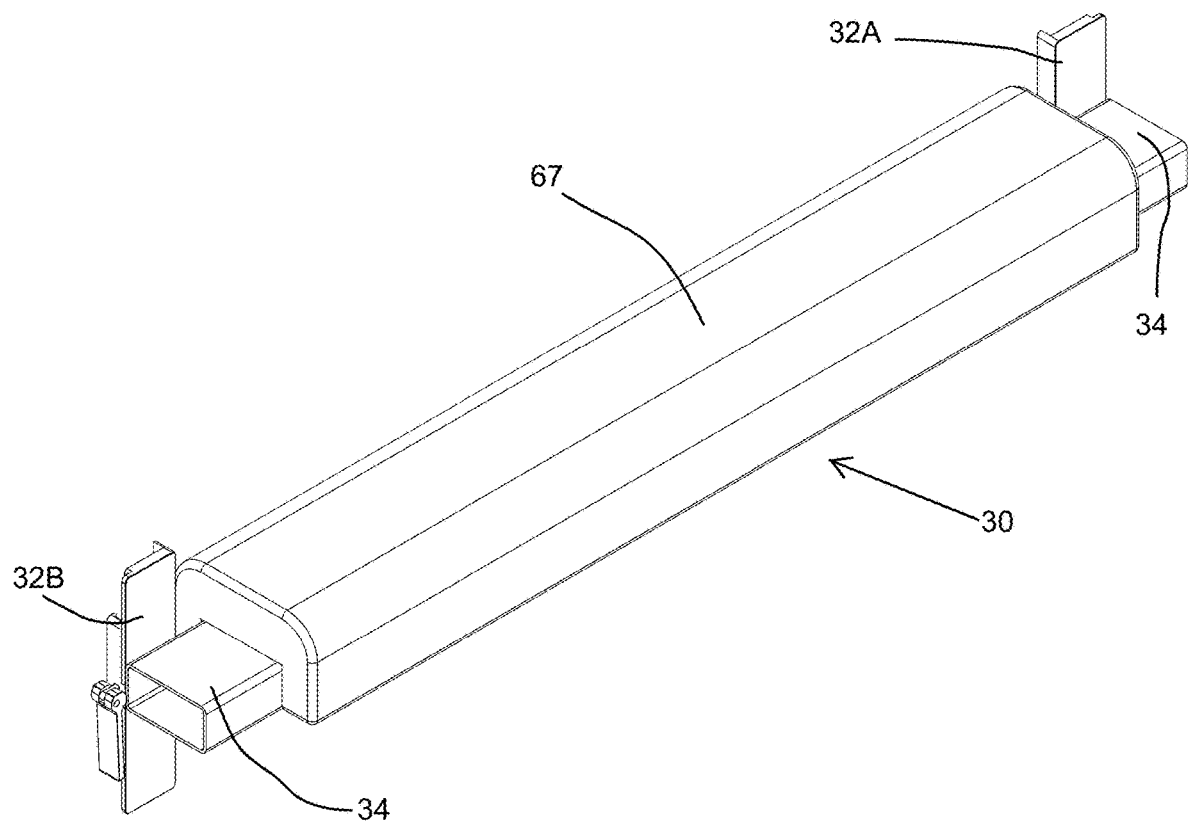
FIG. 31 is a perspective view of another embodiment of an accessory having two mounting portions with a functional portion, according to aspects of the disclosure.

FIG. 31 illustrates an accessory 30 that includes two mounting portions 32A,B connected to a single functional portion 34 in the form of a hip thrust bench 67 for use in a hip thrust exercise. The two mounting portions 32 are configured for mounting to two spaced vertical frame members 110 of a weight rack 100. The hip thrust bench 67 is connected to one mounting portion 32A at one end and to another mounting portion 32B at the opposite end, such that the bench 67 extends between the two mounting portions 32A,B. It is understood that other accessories 30 may be provided that include a different functional portion 34 connected to two or more mounting portions 32, in other embodiments.

Figure 32:
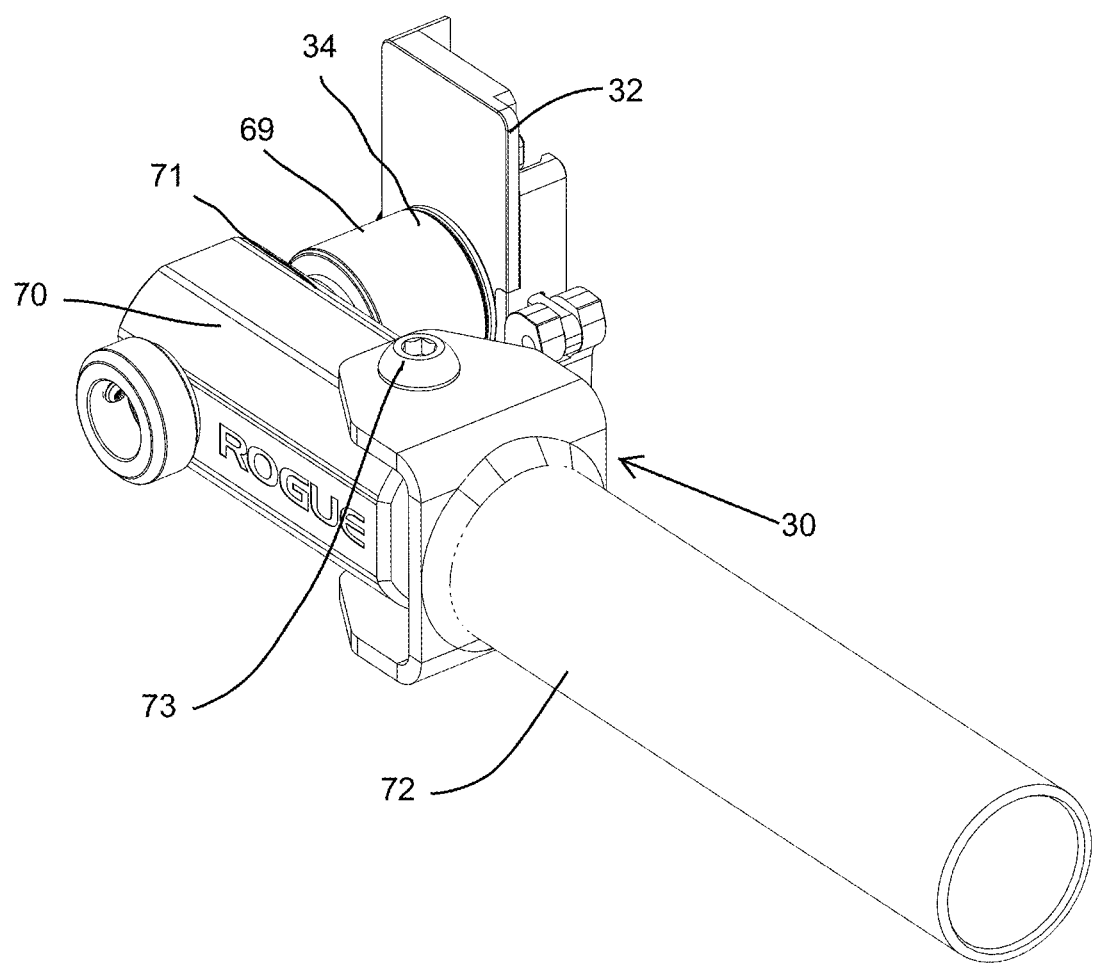
FIG. 32 is a perspective view of another embodiment of an accessory with a functional portion, according to aspects of the disclosure.

FIG. 32 illustrates an accessory 30 with a functional portion 34 that includes a pivoting attachment 68 that may be referred to as a "landmine" attachment. The pivoting attachment 68 includes a fixed base 69 that is fixed to the mounting portion 32, a pivoting body 70 that is pivotably connected to the base 69 at a first pivot connection 71, and a receiver 72 that is pivotably connected to the pivoting body 70 at a second pivot connection 73. The first and second pivot connections 71, 73 pivot on different axes to provide a wide range of motion. The receiver 72 is configured to receive the end of a barbell for use in various exercises.

Figure 33:
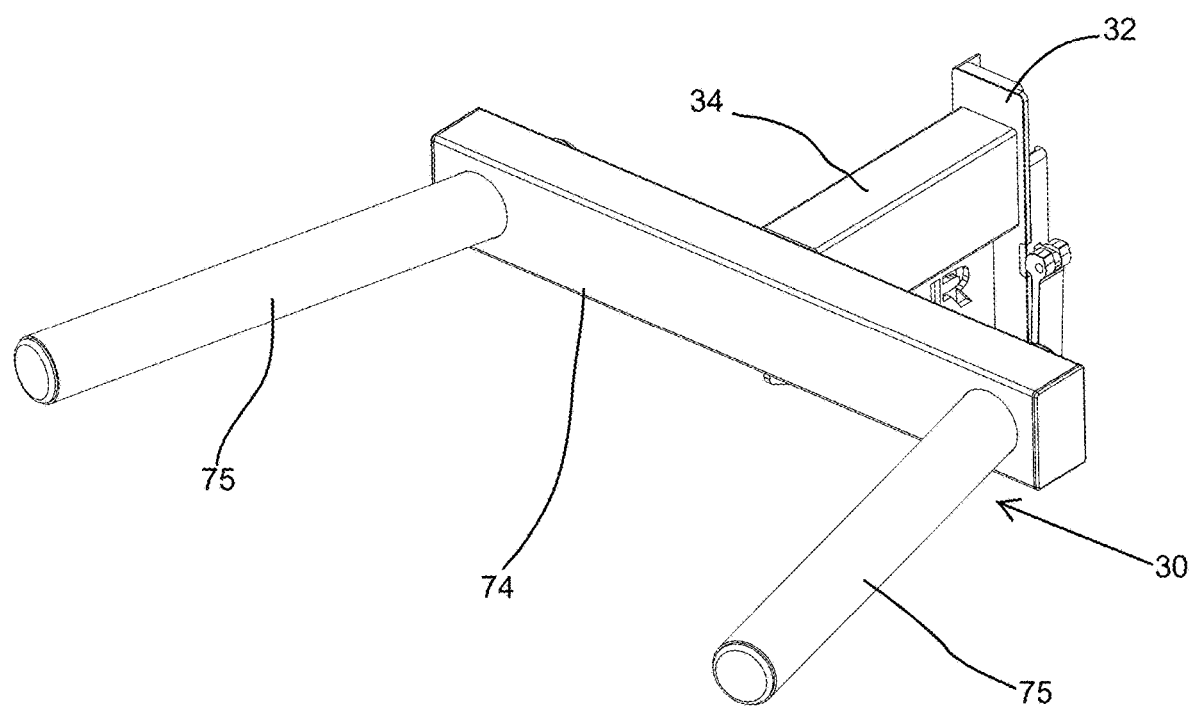
FIG. 33 is a perspective view of another embodiment of an accessory with a functional portion, according to aspects of the disclosure.

FIG. 33 illustrates an accessory 30 with a functional portion 34 that includes a dip attachment 74 that includes two spaced handles 75 for gripping by a user during a dipping exercise. The dip attachment 74 and the handles 75 extend outward from the mounting portion 32 in the transverse direction. Functional portions 34 in the form of other gripping attachments may be provided in a similar configuration in other embodiments.

Figure 34:
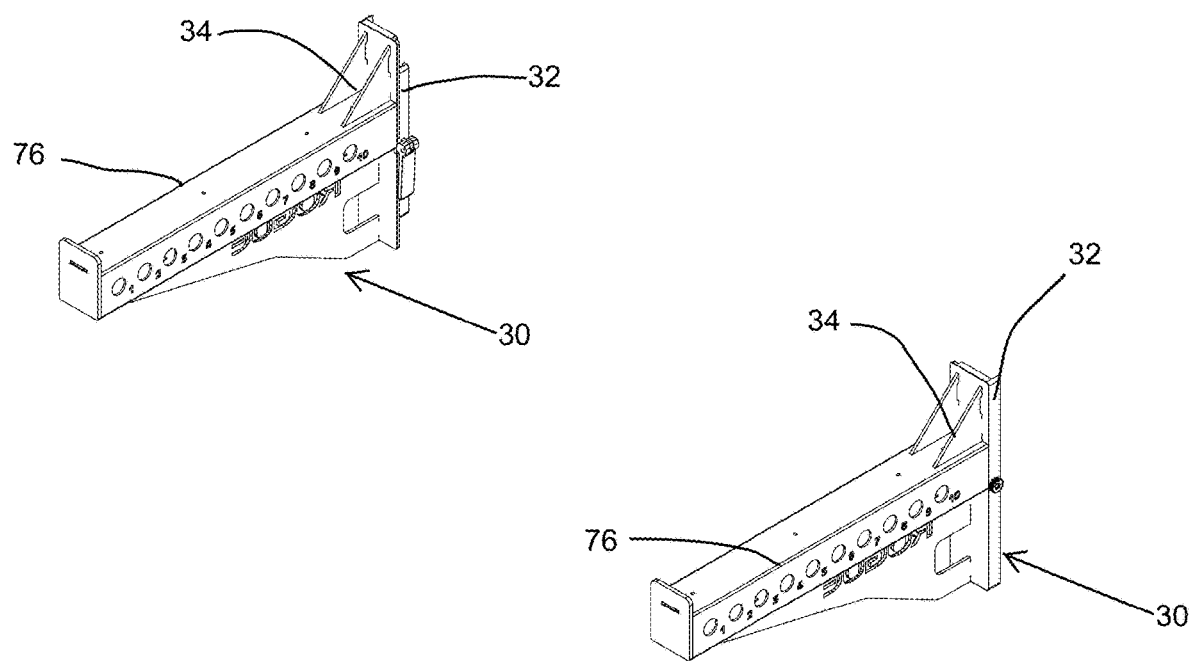
FIG. 34 is a perspective view of another embodiment of a pair of accessories each having a functional portion, according to aspects of the disclosure.

FIG. 34 illustrates a pair of accessories 30 each having a functional portion 34 that includes a spotter arm 76 that extends outward from the mounting portion 32 in the transverse direction. The accessories 30 are provided as a pair that are configured for mounting to two spaced vertical frame members 110 of a weight rack 100. A user can perform a weightlifting exercise between the two spotter arms 76, and the spotter arms 76 can support the barbell if it is dropped during the weightlifting exercise. Other accessories 30 with other types of functional attachments 34 may be similarly provided in pairs in other embodiments.

A method of installing and using the assembly described herein includes connecting the mounting rail 10 to a frame member 110 of the weight rack 100, and then placing the accessory 30 on the mounting rail 10 and operating the locking mechanism 42 as described herein to move the moveable portion 40 to the locked position. A weightlifting exercise may then be performed using the functional portion 34 of the accessory 30. The position of the accessory 30 may be adjusted by operating the locking mechanism 42 as described herein to move the moveable portion 40 to the release position, repositioning the accessory 30 on the mounting rail 10, and then operating the locking mechanism 42 as described herein to move the moveable portion 40 back to the locked position. If another weightlifting exercise is desired to be performed, the accessory 30 may be removed from the mounting rail 10 as described herein, and another accessory 30 having a different functional portion 34 configured for use in a different weightlifting exercise may be connected to the mounting rail 10 as described herein. It is understood that the interchanged accessories 30 may also have mounting portions 32 that are differently configured.

Accessories 30 connected to the rail 10 in this configuration may be used for various exercises in conjunction with other accessories and other structures connected to the weight rack 100, and the mounting configurations described herein permit the accessories 30 to be connected and disconnected more quickly than if the accessories 30 were instead configured for connection directly to the frame member 110 or elsewhere on the weight rack 100. Accordingly, different accessories 30 having different functional attachments 34 can be interchangeably connected to and disconnected from the weight rack by use of the mounting rail 10 and the removable connection structure between the accessory 30 and the mounting rail 10. The mounting connections described herein also provide strong and secure connections that can handle a great deal of weight. Still other benefits and advantages are recognized by those skilled in the art.

Various embodiments of mounting rails and accessories therefor have been described herein, which include various components and features. In other embodiments, the mounting rails and accessories may be provided with any combination of such components and features. It is also understood that in other embodiments, the various devices, components, and features of the mounting rails and accessories described herein may be constructed with similar structural and functional elements having different configurations, including different ornamental appearances.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. The terms "top," "bottom," "front," "side," "rear," and the like, as used herein, are intended for illustrative purposes only and do not limit the embodiments in any way. When used in description of a method or process, the term "providing" as used herein means generally making an article available for further actions, and does not imply that the entity "providing" the article manufactured, assembled, or otherwise produced the article. Nothing in this specification should be construed as requiring a specific three dimensional orientation of structures in order to fall within the scope of this invention, unless explicitly specified by the claims. Additionally, the term "plurality," as used herein, indicates any number greater than one, either disjunctively or conjunctively, as necessary, up to an infinite number. Accordingly, while the specific embodiments have been illustrated and described, numerous modifications come to mind without significantly departing from the spirit of the invention and the scope of protection is only limited by the scope of the accompanying claims.

What is claimed is:

1. An assembly for mounting on a weight rack, comprising:
   a mounting rail having a mounting structure configured for removably mounting the mounting rail on a frame member of a weight rack, the mounting rail comprising a base that is elongated along a longitudinal direction and a plurality of rail sections extending outward from the base and extending in a lateral direction that is perpendicular to the longitudinal direction, each of the plurality of rail sections being identical and having flanges extending laterally outward of the base on opposed lateral edges of the base, the plurality of rail sections being spaced along the longitudinal direction to define a plurality of identical slots between the rail sections,
   wherein the mounting structure of the mounting rail comprises a plurality of mounting pegs extending from an inner surface of the mounting rail opposite the rail sections, each mounting peg having an enlarged head, wherein the mounting pegs are configured to be inserted within holes in the frame member to removably connect the mounting rail to the weight rack;
   an accessory mounted on the mounting rail, the accessory comprising a mounting portion removably connected to the mounting rail and a functional portion connected to the mounting portion and configured for use in a weightlifting exercise, the mounting portion comprising:
   a fixed portion having an outer wall and a first side wall extending transversely from the outer wall, and a first lip extending laterally inward from the first side wall;
   a moveable portion having a second side wall extending transversely to the outer wall of the fixed portion and spaced from the first side wall, and a second lip extending laterally inward from the second side wall, such that the outer wall, the first and second side walls, and the first and second lips combine to define a channel receiving a portion of the mounting rail therein, wherein the moveable portion is moveable with respect to the fixed portion between a release position, where the mounting rail can be disengaged from the mounting portion, and a locked position, where the fixed portion and the moveable portion engage the mounting rail to retain the accessory in connection with the mounting rail such that the first and second lips extend beneath the flanges of a first rail section and a second rail section of the plurality of rail sections of the mounting rail;
   a peg engaged with the fixed portion and the moveable portion and extending across the channel, wherein the peg is received in one of the plurality of slots located between the first and second rail sections and configured to engage side surfaces of the first and second rail sections; and
   a locking mechanism connected to the peg and configured to be moveable between a first position, where the locking mechanism engages the moveable portion to retain the moveable portion in the locked position, and a second position, where the locking mechanism permits the moveable portion to move to the release position, wherein movement of the locking mechanism from the second position to the first position is configured to force the moveable portion to the locked position.

2. The assembly of claim 1, wherein when the moveable portion is in the release position, a space defined between the first and second lips is sufficient to permit the flanges of the first and second rail sections to pass between the first and second lips.

3. The assembly of claim 1, wherein the peg has a first pin at a first end that extends through a first opening in the fixed portion to engage the peg with the fixed portion and a second pin at a second end opposite the first end that extends through a second opening in the moveable portion to engage the peg with the moveable portion.

4. The assembly of claim 3, wherein the first pin is engaged with the fixed portion by a fastener and the second pin is a pivot pin that forms a pivot connection with the locking mechanism.

5. The assembly of claim 3, wherein the locking mechanism comprises a lever that is moveable by pivoting between the first and second positions, and wherein the second pin is a pivot pin that forms a pivot connection with the lever.

6. The assembly of claim 5, wherein the first pin is a threaded pin that is connected to the fixed portion by a threaded fastener, and wherein the lever has a cam surface configured to engage the moveable portion to force the moveable portion to the locked position when the lever is moved from the second position to the first position.

7. The assembly of claim 1, wherein the locking mechanism comprises a lever connected to the peg by a pivot pin to form a pivot connection, and wherein the lever has a cam surface configured to engage the moveable portion to force the moveable portion to the locked position when the lever is moved from the second position to the first position.

8. The assembly of claim 1, wherein the fixed portion has a recess with a first retaining lip extending over the recess, and wherein the moveable portion is received within the recess and has a second retaining lip that engages the first retaining lip to retain the fixed portion and the moveable portion together.

9. The assembly of claim 1, wherein the mounting rail has a plurality of projections on the inner surface of the mounting rail, each of the projections having an aperture extending through the projection and through a thickness of the mounting rail, wherein the mounting pegs are connected to the mounting rail by fasteners received through the apertures, such that the mounting pegs engage the projections.

10. A weightlifting rack, comprising:
a plurality of frame members including a plurality of horizontal frame members and a plurality of vertical frame members connected together to form a frame for use in performing a weightlifting exercise, the plurality of frame members including a first frame member extending along a longitudinal direction and having a plurality of holes extending therethrough;
a mounting rail removably mounted on the first frame member, the mounting rail having a mounting structure received in at least one of the plurality of holes to removably mount the mounting rail on a frame member of a weight rack, the mounting rail comprising a base that is elongated along the longitudinal direction and a plurality of rail sections extending outward from the base and extending in a lateral direction that is perpendicular to the longitudinal direction, each of the plurality of rail sections being identical and having flanges extending laterally outward of the base on opposed lateral edges of the base, the plurality of rail sections being spaced along the longitudinal direction to define a plurality of identical slots between the rail sections;
an accessory mounted on the mounting rail, the accessory comprising a mounting portion removably connected to the mounting rail and a functional portion connected to the mounting portion and configured for use in a weightlifting exercise, the mounting portion comprising:
a fixed portion having an outer wall and a first side wall extending transversely from the outer wall, and a first lip extending laterally inward from the first side wall;
a moveable portion having a second side wall extending transversely to the outer wall of the fixed portion and spaced from the first side wall, and a second lip extending laterally inward from the second side wall, such that the outer wall, the first and second side walls, and the first and second lips combine to define a channel receiving a portion of the mounting rail therein, wherein the moveable portion is moveable with respect to the fixed portion between a release position, where the mounting rail can be disengaged from the mounting portion, and a locked position, where the fixed portion and the moveable portion engage the mounting rail to retain the accessory in connection with the mounting rail such that the first and second lips extend beneath the flanges of a first rail section and a second rail section of the plurality of rail sections of the mounting rail;
a peg engaged with the fixed portion and the moveable portion and extending across the channel, wherein the peg is received in one of the plurality of slots located between the first and second rail sections and configured to engage side surfaces of the first and second rail sections; and
a locking mechanism connected to the peg and configured to be moveable between a first position, where the locking mechanism engages the moveable portion to retain the moveable portion in the locked position, and a second position, where the locking mechanism permits the moveable portion to move to the release position, wherein movement of the locking mechanism from the second position to the first position is configured to force the moveable portion to the locked position.

11. The weightlifting rack of claim 10, wherein the plurality of holes of the first frame member comprise first and second key-shaped holes, each having a circular periphery with a cut-out having a narrower width than the circular periphery extending outward from the circular periphery, wherein the mounting structure of the mounting rail comprises first and second mounting pegs extending from an inner surface of the mounting rail opposite the rail sections, each of the first and second mounting pegs having an elongated body and an enlarged head having a width that is smaller than the circular peripheries and larger than the narrower widths of the cut-outs of the first and second key-shaped holes, and wherein the mounting rail is configured to be mounted on a first surface of the first frame member by inserting the first and second mounting pegs through the first and second key-shaped holes such that the elongated bodies of the first and second mounting pegs are received in the cut-outs of the first and second key-shaped holes and the enlarged heads engage a second surface of the first frame member opposite the first surface.

12. The weightlifting rack of claim 11, wherein the mounting rail has first and second projections on the inner surface of the mounting rail, each of the first and second projections having an aperture extending therethrough and through a thickness of the mounting rail, wherein the first and second mounting pegs are connected to the mounting rail by fasteners received through the apertures, such that the first and second mounting pegs engage the first and second projections.

13. The weightlifting rack of claim 10, wherein the locking mechanism comprises a lever that is moveable by pivoting between the first and second positions, the lever having a cam surface configured to engage the moveable portion to force the moveable portion to the locked position when the lever is moved from the second position to the first position, wherein the peg has a first pin at a first end that extends through a first opening in the fixed portion to and is engaged with the fixed portion by a fastener and a second pin at a second end opposite the first end that extends through a second opening in the moveable portion and engages the lever to form a pivot connection with the lever.

14. The weightlifting rack of claim 10, wherein the plurality of holes of the first frame member comprise first and second holes, wherein the mounting structure of the mounting rail comprises first and second removable connection members, and wherein the mounting rail is configured to be mounted on a first surface of the first frame member by inserting the first and second connection members through the first and second holes, such that the first and second connection members engage a second surface of the first frame member opposite the first surface.

15. A mounting rail configured for removable connection to an elongated frame member of a weight rack having a plurality of holes along a length thereof, the mounting rail comprising:
- a base that is elongated along a longitudinal direction, the base having an inner surface and an outer surface opposite the outer surface, wherein the inner and outer surfaces are both elongated along the longitudinal direction;
- a plurality of rail sections extending outward from the outer surface of the base and extending in a lateral direction that is perpendicular to the longitudinal direction, each of the plurality of rail sections being identical and having flanges extending laterally outward of the base on opposed lateral edges of the base, the plurality of rail sections being spaced along the longitudinal direction to define a plurality of identical slots between the rail sections;
- a mounting structure configured for removably mounting the mounting rail on the frame member of the weight rack, the mounting structure comprising at least one elongated member extending inward from the inner surface of the base and configured to be received in at least one of the plurality of holes to removably mount the mounting rail on the frame member of the weight rack.

16. The mounting rail of claim 15, wherein the at least one elongated member comprises a plurality of mounting pegs extending inward from the inner surface of the base, each mounting peg having an enlarged head, wherein the mounting pegs are configured to be inserted within the holes in the frame member to removably connect the mounting rail to the weight rack.

17. The mounting rail of claim 16, wherein the base has a plurality of projections on the inner surface, each of the projections having an aperture extending through the projection and through a thickness of the mounting rail, wherein the mounting pegs are connected to the mounting rail by fasteners received through the apertures, such that the mounting pegs engage the projections.

18. The mounting rail of claim 15, wherein the at least one elongated member comprises a mounting peg extending inward from the inner surface of the base and having an enlarged head, wherein the mounting peg is configured to be inserted within one of the holes in the frame member to removably connect the mounting rail to the weight rack.

19. The mounting rail of claim 15, wherein the mounting structure further comprises at least one removeable fastener attached to the at least one elongated member and configured to removably connect the at least one elongated member to the frame member.

20. The mounting rail of claim 15, wherein the mounting structure further comprises a plurality of elongated members including the at least one elongated member, the plurality of elongated members configured to be received in several of the plurality of holes to removably mount the mounting rail on the frame member of the weight rack.

21. The mounting rail of claim 20, wherein the base has a plurality of projections on the inner surface, each of the projections having an aperture extending through the projection and through a thickness of the mounting rail, wherein the elongated members are connected to the mounting rail by fasteners received through the apertures, such that the elongated members engage the projections.

22. The mounting rail of claim 15, wherein the base has one or more apertures extending through the base, from the inner surface to the outer surface, and wherein each elongated member is connected to a fastener extending through one of the one or more apertures to connect the respective elongated member to the base.

* * * * *